(12) United States Patent
Meir et al.

(10) Patent No.: US 10,466,359 B2
(45) Date of Patent: Nov. 5, 2019

(54) METHOD AND SYSTEM FOR LIGHT PATTERNING AND IMAGING

(71) Applicant: Inuitive Ltd., RaAnana (IL)

(72) Inventors: Noam Meir, Herzlia (IL); David Ben-Bassat, Ganei-Tikva (IL); Avraham Shimon, Moshav Nes Harim (IL); Arnon Tadmor, Herzlia (IL); Eyal Naimi, Bet-Shemesh (IL)

(73) Assignee: Inuitive Ltd., RaAnana (IL)

( * ) Notice: Subject to any disclaimer, the term of this patent is extended or adjusted under 35 U.S.C. 154(b) by 4 days.

(21) Appl. No.: 14/758,610

(22) PCT Filed: Jan. 1, 2014

(86) PCT No.: PCT/IL2014/050004
§ 371 (c)(1),
(2) Date: Jun. 30, 2015

(87) PCT Pub. No.: WO2014/106843
PCT Pub. Date: Jul. 10, 2014

(65) Prior Publication Data
US 2015/0341619 A1    Nov. 26, 2015

Related U.S. Application Data

(60) Provisional application No. 61/748,135, filed on Jan. 2, 2013, provisional application No. 61/748,098, filed on Jan. 1, 2013.

(51) Int. Cl.
*H04N 5/374* (2011.01)
*G06T 3/40* (2006.01)
(Continued)

(52) U.S. Cl.
CPC ............ *G01S 17/89* (2013.01); *G01B 11/245* (2013.01); *G01B 11/25* (2013.01);
(Continued)

(58) Field of Classification Search
CPC ........... H04N 13/0253; H04N 13/0242; H04N 13/0257; H04N 2209/046; H04N 5/33;
(Continued)

(56) References Cited

U.S. PATENT DOCUMENTS

| | | | |
|---|---|---|---|
| 5,081,530 A | | 1/1992 | Medina |
| 6,292,212 B1 * | | 9/2001 | Zigadlo .................... H04N 5/33 250/338.1 |

(Continued)

FOREIGN PATENT DOCUMENTS

| | | |
|---|---|---|
| WO | WO 2012/073156 | 6/2012 |
| WO | WO 2014/106843 | 7/2014 |

OTHER PUBLICATIONS

International Preliminary Report on Patentability dated Jul. 16, 2015 From the International Bureau of WIPO Re. Application No. PCT/IL2014/050004.

(Continued)

*Primary Examiner* — Anand S Rao
*Assistant Examiner* — Tyler B Edwards

(57) ABSTRACT

An imaging system is disclosed. The system comprises: a first imaging device and a second imaging device being spaced apart and configured to provide partially overlapping field-of-views of a scene over a spectral range from infrared to visible light. The system comprises at least one infrared light source constituted for illuminating at least the overlap with patterned infrared light, and a computer system configured for receiving image data pertaining to infrared and visible light acquired by the imaging devices, and computing three-dimensional information of the scene based on the image data. The image data optionally and preferably comprises the patterned infrared light as acquired by both the imaging devices.

14 Claims, 14 Drawing Sheets

(51) Int. Cl.
| | |
|---|---|
| *H04N 5/33* | (2006.01) |
| *G06F 3/01* | (2006.01) |
| *H04N 5/353* | (2011.01) |
| *H04N 5/372* | (2011.01) |
| *G01S 17/89* | (2006.01) |
| *H04N 13/243* | (2018.01) |
| *H04N 13/254* | (2018.01) |
| *H04N 13/257* | (2018.01) |
| *G01S 17/06* | (2006.01) |
| *G01B 11/25* | (2006.01) |
| *G01B 11/245* | (2006.01) |
| *G01S 17/87* | (2006.01) |
| *G01S 7/481* | (2006.01) |
| *G01S 7/486* | (2006.01) |

(52) U.S. Cl.
CPC ........ *G01B 11/2545* (2013.01); *G01S 7/4811* (2013.01); *G01S 7/4863* (2013.01); *G01S 17/06* (2013.01); *G01S 17/87* (2013.01); *G06F 3/017* (2013.01); *G06T 3/4015* (2013.01); *H04N 5/33* (2013.01); *H04N 5/3532* (2013.01); *H04N 5/3535* (2013.01); *H04N 5/372* (2013.01); *H04N 5/374* (2013.01); *H04N 13/243* (2018.05); *H04N 13/254* (2018.05); *H04N 13/257* (2018.05); *G06T 2207/30241* (2013.01); *H04N 2209/046* (2013.01)

(58) Field of Classification Search
CPC .... H04N 5/3532; H04N 5/3535; H04N 5/372; H04N 5/374
See application file for complete search history.

(56) References Cited

U.S. PATENT DOCUMENTS

| | | | |
|---|---|---|---|
| 7,428,997 B2 | 9/2008 | Wiklof et al. | |
| 2003/0042401 A1* | 3/2003 | Gartner | G01B 11/245 250/208.1 |
| 2009/0238449 A1* | 9/2009 | Zhang | G01B 11/2536 382/165 |
| 2010/0128221 A1* | 5/2010 | Muller | G02B 21/0028 351/207 |
| 2010/0309288 A1* | 12/2010 | Stettner | G01S 17/023 348/43 |
| 2011/0013742 A1* | 1/2011 | Zaiki | A61B 6/035 378/15 |
| 2011/0187878 A1* | 8/2011 | Mor | G02B 27/0983 348/218.1 |
| 2012/0075427 A1 | 3/2012 | Yahav et al. | |
| 2012/0188420 A1* | 7/2012 | Black | H04N 5/2253 348/279 |
| 2012/0194650 A1 | 8/2012 | Izadi et al. | |
| 2012/0218437 A1* | 8/2012 | Hermary | G01B 11/245 348/222.1 |
| 2012/0220385 A1 | 8/2012 | Richardson et al. | |

OTHER PUBLICATIONS

International Search Report and the Written Opinion dated Jun. 26, 2014 From the International Searching Authority Re. Application No. PCT/IL2014/050004.

* cited by examiner

METHOD AND SYSTEM FOR LIGHT PATTERNING AND IMAGING

RELATED APPLICATIONS

This application is a National Phase of PCT Patent Application No. PCT/IL2014/050004 having International filing date of Jan. 1, 2014, which claims the benefit of priority under 35 USC § 119(e) of U.S. Provisional Patent Application Nos. 61/748,135 filed on Jan. 2, 2013 and 61/748,098 filed on Jan. 1, 2013. The contents of the above applications are all incorporated by reference as if fully set forth herein in their entirety.

FIELD AND BACKGROUND OF THE INVENTION

The present invention, in some embodiments thereof, relates to optoelectronics and imaging, and more particularly, but not exclusively, to light patterning and computer vision imaging.

The use of cameras in computer systems, commonly termed computer vision, continues to increase. Video conferencing, live feeds and the like are common applications that require computer vision, and advanced user interfaces that use computer vision are becoming increasingly available for desktop, home, and mobile computing devices.

Conventional camera applications involve the use of a camera operator who controls the camera, and, in particular, controls the image that the camera records by appropriately orienting the camera. The camera operator may also provide direction to improve the appearance of the objects being recorded. In the terminology common to the field, proper image framing assures that a desired image is included within the field of view of the camera. A typical computer vision application is often operated using a fixed position camera and no camera operator per se.

Some computer vision systems employ stereo camera systems to acquire three-dimensional information about objects. Typical stereo camera systems include two or more electronic cameras which are mounted at spaced apart locations. The electronic cameras have partially overlapping fields of view. A computer connected to receive images from each of the cameras can compare the images to derive three-dimensional information about objects in the field of view. Information such as the distances to the objects and the sizes, dimensions and orientations of the objects can be determined by triangulation.

Currently available stereo camera systems use small cameras which have arrays of light sensing elements such as charge coupled devices (CCDs), matrix complementary metal oxide semiconductor (CMOS) sensors or the like. A typical camera, as is used in a typical stereo camera system, comprises a circuit board on which a light sensing array is mounted. A lens is supported above the light sensing array by a lens holder. The entire camera is mounted by the circuit board to a suitable support in a desired position relative to other cameras in the stereo camera system.

In the art of digital imaging, particularly for the purpose of computer vision, the current trend is to eliminate the effect of infrared ((IR) light upon the image sensors. This traditional need arises because the most common semiconductor-based image sensing devices respond not only to visible light, but also to IR light in the wavelength range of approximately 680 to 1100 nanometers. Responses to IR light are known to distort the image so that traditional digital imaging techniques are unable to obtain a high-quality color image, or correctly preserve scene luminance in monochrome imagers. The effect of IR light is typically eliminated using CCD or CMOS based image sensors which are supplemented by an IR CUT filter. The IR CUT filter is part of the optical path, either positioned over the imager sensor array or overlying the lens or interposed within other optical elements.

In the field of image capturing and analysis, light pattern illumination is oftentimes employed. In light pattern illumination, a scene is being illuminated by a light source possibly via a mask of some kind so that a specified geometric pattern of illumination is achieved. After capturing the scene with capturing device such as a camera, the captured images (or video) can be analyzed taking into account the predefined illumination pattern. The prior knowledge about the illumination pattern geometry facilitates the image processing and assist in determining, among other things, a depth map of the scene.

SUMMARY OF THE INVENTION

According to an aspect of some embodiments of the present invention there is provided an imaging system. The system comprises: a first imaging device and a second imaging device being spaced apart and configured to provide partially overlapping field-of-views of a scene over a spectral range from infrared to visible light. The system comprises at least one infrared light source constituted for illuminating at least the overlap with patterned infrared light, and a computer system configured for receiving image data pertaining to infrared and visible light acquired by the imaging devices, and computing three-dimensional information of the scene based on the image data. The image data optionally and preferably comprises the patterned infrared light as acquired by both the imaging devices.

According to some embodiments of the invention the system the infrared light source(s) comprises a first infrared light source configured for generating the patterned infrared light, and a second infrared light source configured for generating flood infrared illumination.

According to some embodiments of the invention the first and the second infrared light sources are configured for independent operation.

According to some embodiments of the invention at least one of the first and the second imaging devices is a pixilated imaging device having a plurality of sensor pixels, wherein each of the sensor pixels is configured for generating a signal in response to both infrared light and visible light.

According to some embodiments of the invention at least one of the imaging devices comprises a color filter array, being aligned with the sensor pixels.

According to an aspect of some embodiments of the present invention there is provided an imaging system. The system comprises: an imaging device having a rolling shutter and being configured for acquiring an image of a scene over a spectral range from infrared to visible light, according to a sensing sequence of the rolling shutter. The system comprises an infrared light source configured for generating an infrared pulse sequence illuminating at least part of the scene, and a controller for synchronizing the infrared pulse sequence with the sensing sequence.

According to some embodiments of the invention the controller is configured for synchronizing the infrared pulse sequence with an exposure time of the imaging device.

According to some embodiments of the invention the imaging device comprises a timing circuit configured for generating at least a line valid signal for controlling the exposure time, and wherein the controller is configured to offset the infrared pulse sequence with respect to the line valid signal such that an onset of an infrared pulse precedes an onset of a line valid signal pulse by a predetermined time offset.

According to some embodiments of the invention the system comprises a plurality of infrared light sources, each constituted to illuminate a predetermined part of the scene, wherein the controller is configured for activating and deactivating the light sources synchronously with a temporal field-of-view provided by the rolling shutter.

According to some embodiments of the invention at least one of the plurality of infrared light sources is configured for generating flood infrared illumination.

According to some embodiments of the invention at least one of the infrared light sources is configured for generating an infrared pattern.

According to some embodiments of the invention at least one of the plurality of infrared light sources is a light pattern device. According to some embodiments of the invention the light pattern device comprises: a first optical layer having an arrangement of monolithic light source elements, each light source element having a patterned light emitting surface configured to provide a light beam which is spatially patterned according to the light emitting surface; and a second optical layer having an arrangement of light redirecting elements and being characterized by a focal plane, the light redirecting elements being constituted to redirect patterned light beams generated by the first optical layer to provide patterned illumination.

According to some embodiments of the invention the first optical layer is at or near the focal plane.

According to some embodiments of the invention the system comprises a light diffuser positioned between the first and the second optical layers at or near the focal plane.

According to some embodiments of the invention the light source elements are arranged in individually addressable lines.

According to some embodiments of the invention each of the light source elements is addressable individually.

According to some embodiments of the invention the imaging device is a pixilated imaging device having a plurality of sensor pixels, and wherein each of the sensor pixels is configured for generating a signal in response to both infrared light and visible light.

According to some embodiments of the invention the imaging devices comprises a color filter array.

According to an aspect of some embodiments of the present invention there is provided an imaging system. The system comprises: a first imaging device and a second imaging device being spaced apart and configured to provide partially overlapping field-of-views of a scene over a spectral range from infrared to visible light, and at least one infrared light source constituted for illuminating at least part of the scene. The system comprises a controller for selecting an operation mode from a group consisting of: (i) a first mode in which the at least one infrared light source is not activated, (ii) a second mode in which the at least one infrared light is activated to generate flood infrared illumination; and (iii) a third mode in which the at least one infrared light is activated to generate an infrared pattern at least at the overlap.

According to some embodiments of the invention the system comprises a computer system configured to determine an illumination condition, wherein the controller is configured for automatically selecting the operation mode responsively to the illumination condition.

According to some embodiments of the invention the system comprises a computer system configured to calculate a disparity score characterizing disparity between image data corresponding to the first imaging device and image data corresponding to the imaging device, wherein the controller is configured to for automatically selecting the operation mode responsively to the a disparity score.

According to some embodiments of the invention the system comprises a computer system configured to determine an illumination condition, wherein the controller is configured to select a percentage of frames allocated for each operation mode responsively to the illumination condition.

According to some embodiments of the invention the controller is configured to operate the infrared light source at a duty cycle selected responsively to the operation mode.

According to some embodiments of the invention the system comprises a computer system configured to detect a gesture of at least one individual in the scene, wherein the controller is configured to a percentage of frames allocated to each operation mode responsively to the gesture detection.

According to some embodiments of the invention the controller is configured to vary percentage of frames allocated to each operation mode to maintain a signal-to-noise ratio (SNR) within a predetermined SNR range.

According to some embodiments of the invention the controller is configured to vary a power of the infrared light source to maintain a signal-to-noise ratio (SNR) within a predetermined SNR range.

According to some embodiments of the invention at least one of the imaging devices comprises a color filter array, and the system comprises a computer system configured for demosaicing image data received from the at least one imaging device.

According to some embodiments of the invention the system comprises computer system configured for tracking a gaze of an individual in the scene.

According to some embodiments of the invention the system comprises a computer system configured for constructing a three-dimensional reconstruction of the scene.

According to some embodiments of the invention the system comprises a computer system configured for executing object recognition procedure.

According to an aspect of some embodiments of the present invention there is provided a method of imaging a scene. The method comprises: illuminating at least part of the scene with patterned infrared light to provide a an infrared pattern, and acquiring a first image and a second image from two spaced viewpoints to provide image data representing partially overlapping field-of-views of the scene over a spectral range from infrared to visible light. According to some embodiments of the invention the overlap comprises the infrared pattern. According to some embodiments of the invention the image data comprises the infrared pattern as acquired from by both the viewpoints; and computing three-dimensional information of the scene based on the image data.

According to some embodiments of the invention the method further comprising flooding at least part of the scene by infrared illumination.

According to an aspect of some embodiments of the present invention there is provided a method of imaging a scene. The method comprises: acquiring an image of the scene over a spectral range from infrared to visible light, according to a sensing sequence of a rolling shutter; and generating an infrared pulse sequence synchronously with the sensing sequence to illuminate at least part of the scene.

According to some embodiments of the invention the acquiring the image is characterized by an exposure time, and the method further comprises synchronizing the infrared pulse sequence with the exposure time.

According to some embodiments of the invention the method comprises generating at least a line valid signal for controlling the exposure time, wherein the synchronizing the infrared pulse sequence with the exposure time comprises offsetting the infrared pulse sequence with respect to the line valid signal such that an onset of an infrared pulse precedes an onset of a line valid signal pulse by a predetermined time offset.

According to some embodiments of the invention the method illuminates different parts of the scene using different infrared light sources, wherein the method comprises activating and deactivating the light sources synchronously with a temporal field-of-view provided by the rolling shutter.

According to an aspect of some embodiments of the present invention there is provided a light pattern device. The device comprises: a monolithic light source element having a patterned light emitting surface configured to provide a light beam which is spatially patterned according to the light emitting surface; and a light redirecting element characterized by focal plane and constituted to redirect the patterned light beam to provide patterned illumination. According to some embodiments of the invention the patterned light emitting surface is at or near the focal plane.

According to some embodiments of the invention the device comprises a light diffuser, between the light source element and the light redirecting element.

According to an aspect of some embodiments of the present invention there is provided a light pattern device. The device comprises a monolithic light source element having a patterned light emitting surface configured to provide a light beam; a light redirecting element characterized by focal plane and constituted to redirect the light beam; and a patterned light diffuser positioned between the light source element and the light redirecting element, at or near the focal plane.

According to some embodiments of the invention the light redirecting element comprises at least one optical element selected from the group consisting of: a lens, a diffractive optical element, a microlens, and a microlens array.

According to some embodiments of the invention the device comprises a spatial light modulator configured for spatially modulating the redirected light.

According to some embodiments of the invention the spatial light modulator comprises at least one element selected from the group consisting of: a refractive optical element, a diffractive optical element, a lens, a Fresnel lens, a micro lens array, an optical prism foil, a holographic element, and a spatial filter.

According to some embodiments of the invention the light redirecting element comprises a collimating lens, wherein the spatial light modulator comprises a diffractive optics element arranged to spatially modulate the light in respect to at least one of: intensity, wavelength and angular distribution.

According to some embodiments of the invention the spatial light modulator comprises a patterned slide arranged to spatially modulate the light intensity.

According to some embodiments of the invention the spatial light modulator comprises a projection lens and a patterned slide arranged to spatially modulate light intensity, and wherein the light redirecting element comprises at least one collimating lens.

According to some embodiments of the invention the light source comprises at least one element selected from the group consisting of: a light emitting diode (LED), a LED array, a laser source, a laser source array and a semiconductor light source.

According to an aspect of some embodiments of the present invention there is provided a light pattern system, comprising an arrangement of a plurality of light pattern devices, each being the light pattern device as delineated above and optionally as further exemplified below.

According to an aspect of some embodiments of the present invention there is provided a light pattern system. The system comprises a first optical layer having an arrangement of monolithic light source elements, each light source element having a patterned light emitting surface configured to provide a light beam which is spatially patterned according to the light emitting surface. The system comprises a second optical layer having an arrangement of light redirecting elements and being characterized by a focal plane. The light redirecting elements are constituted to redirect patterned light beams generated by the first optical layer to provide patterned illumination. In some embodiments of the present invention the first optical layer is at or near the focal plane.

According to an aspect of some embodiments of the present invention there is provided a light pattern system. The system comprises a first optical layer having an arrangement of monolithic light source elements, each light source element having a light emitting surface configured to provide a light beam. The system comprises a second optical layer having an arrangement of light redirecting elements and being characterized by a focal plane. The system comprises a patterned light diffuser positioned between the first and the second optical layers, at or near the focal plane. The light redirecting elements are constituted to redirect light beams generated by the first layer and patterned by the light diffuser.

According to some embodiments of the invention the light source elements are arranged in individually addressable lines.

According to some embodiments of the invention each of the light source elements is addressable individually.

According to some embodiments of the invention the system further comprises an arrangement of electronic switches integrated monolithically on the same optical layer with the light source elements, wherein each of the electronic switches is configured to activate and deactivate at least one of the light source elements.

According to an aspect of some embodiments of the present invention there is provided a method of generating patterned illumination. The method comprises: operating a monolithic light source element having a patterned light emitting surface to provide a light beam which is spatially patterned according to the light emitting surface; and redirecting the patterned light beam to project the light beam onto an object at a distance from the monolithic light source element. According to some embodiments of the invention the pattern of the light emitting surface is projected so as to image the pattern on the object.

According to some embodiments of the invention the method comprises diffusing the light beam prior to the redirection.

According to an aspect of some embodiments of the present invention there is provided a method of generating patterned illumination. The method comprises: operating a monolithic light source element having a light emitting surface to provide a light beam; diffusing the light beam to provide a patterned light beam; and redirecting the patterned light beam to project the light beam onto an object at a distance from the monolithic light source element. According to some embodiments of the invention the diffusing is by a patterned light diffuser, and the pattern of the light diffuser is projected so as to image the pattern on the object.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions.

Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
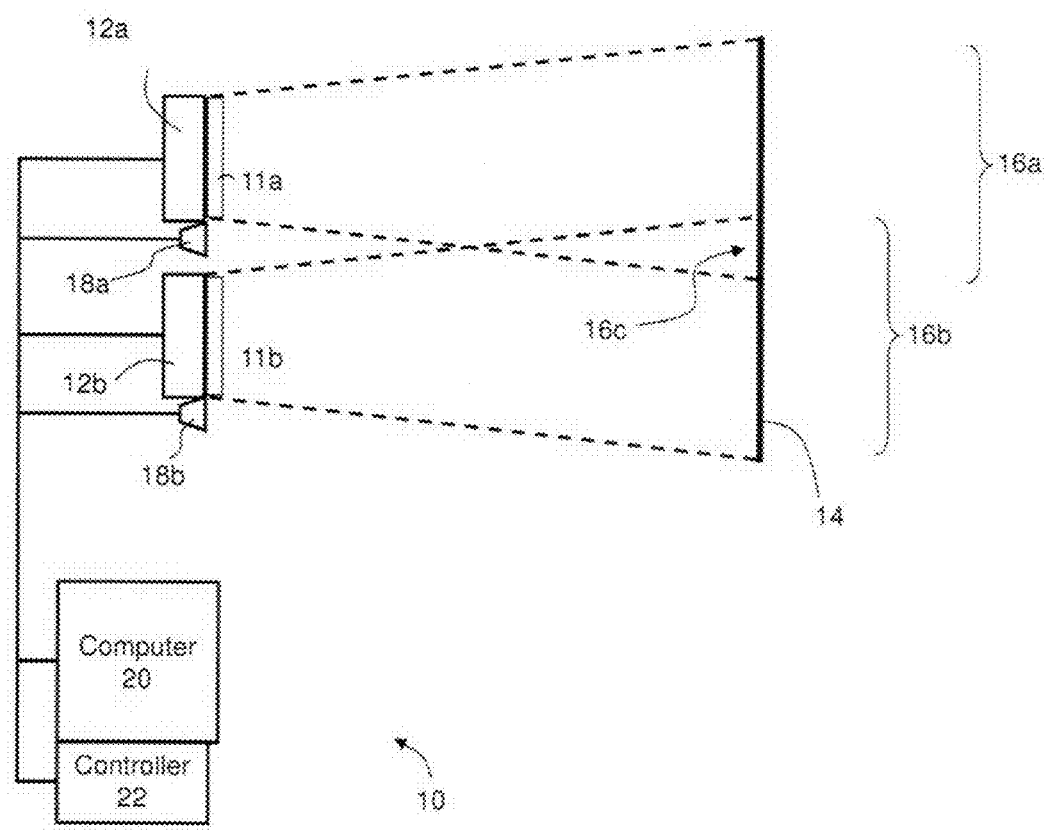
FIG. 1 is a schematic illustration of an imaging system according to some embodiments of the present invention.

The present invention, in some embodiments thereof, relates to imaging and, more particularly, but not exclusively, to computer vision imaging.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 illustrates an imaging system 10 according to some embodiments of the present invention. Imaging system 10 is particularly useful in computer vision applications, but may also be employed as an imaging system on other platforms.

System 10 comprises one or more imaging devices. Shown in FIG. 1 are a first imaging device 12*a* and a second imaging device 12*b*, spaced apart from each other. However, it is to be understood that it is not intended to limit the scope of the present invention to a system with two imaging devices and that configurations with one imaging device or more than two (e.g., 3, 4, 5 or more) imaging devices are not excluded from the scope of the present invention. Herein, unless explicitly stated, a reference to imaging devices in the plural form should be construed as a reference to one or more imaging devices.

Each imaging device is preferably configured for providing a stream of image data. The stream represents a series of frames or a series of batches of frames captured at a rate which is selected so as to provide sufficient information to allow spatial as well as time-dependent inspection or analysis. The series of frames or batches of frames collectively referred to as "image." For example, the stream of image data can form a video image.

In various exemplary embodiments of the invention at least one of the imaging devices is configured to provide a field-of-view of a scene 14 or a part thereof over a spectral range from infrared to visible light. Preferably, at least one, more preferably, all the imaging devices comprise a pixelated imager, such as, but not limited to, a CCD or CMOS matrix, which is devoid of IR CUT filter and which therefore generates a signal in response to light at any wavelength within the visible range and any wavelength within the IR range, more preferably the near IR range.

When the imaging devices comprise pixelated imagers, such as a CCD or CMOS imagers, a color filter array is preferably employed in each imager, so as to allow to separately detect photons of different visible wavelength ranges, typically, but not necessarily, to separately detect red photons, green photons and blue photons. Also contemplated, are embodiments in which the imaging device comprises 3 or more separated imager, each being overplayed by a filter of different color (known as 3CCD configuration).

The color filter array is preferably placed in front of the pixels so that each pixel measures the light of the color of its associated filter. For example, in various exemplary embodiments of the invention each pixel of the imager is covered with either a red, green or blue filter, according to a specific pattern, to respectively acquire spectrum information of long, medium, and short wavelengths. In some embodiments of the present invention the imager has at least one pixel that is not covered by any colored filter (RGBW) or covered with IR filter or with a different color then RGB (e.g., Cyan or Orange).

In some embodiments of the present invention a global filter 11a, 11b that covers all the pixels of the respective device 12a, 12b is employed. For example, such a filter can be part of the optical lens of the imaging device. Filter 11 optionally and preferably has a dedicated transmission spectrum that matches the spectrum of the pixel filters and/or the spectrum of the light sources 18a and 18b. For example filter 11a, 11b can be a dual band pass filter having a first band selected to transmit visible light and a second band selected to transmit infrared light generated by light sources 18a and 18b, wherein wavelengths outside these bands are substantially blocked (absorbed or reflected). The first band can be selected to transmit all visible light (e.g., to transmit light rays having wavelength from about 400 nm to about 700 nm), and the second band can selected to transmit infrared light from about 800 nm to about 900 nm. In these embodiments, light sources 18a and 18b preferably generate light from at a wavelength of from about 800 nm to about 900 nm.

Figures 3, 4A:
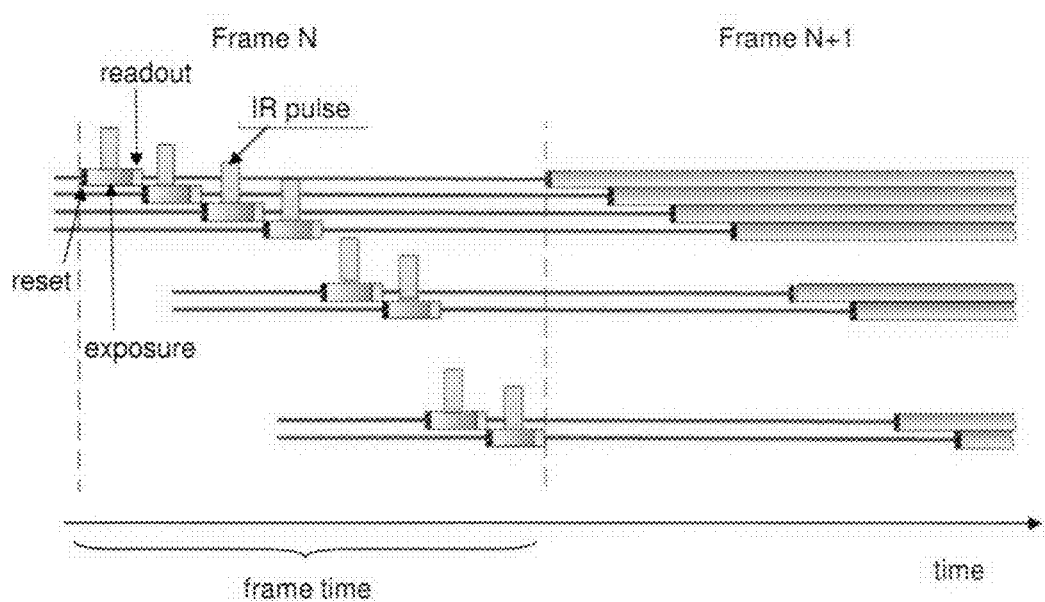
FIG. 3 is a schematic illustration exemplifying a Bayer filter suitable for some present embodiments of the present invention.
FIGS. 4A-C are schematic illustrations of synchronizations between an imaging device and an infrared pulse sequence according to some embodiments of the present invention.

A preferred color filter array is a Bayer filter disclosed in U.S. Pat. No. 3,971,065, the contents of which are hereby incorporated by reference. A Bayer filter is designed to be analogous to the cones of the human visual system, and has red, green, and blue color filter elements (typically, but not necessarily, micro tense elements) superimposed on the pixels of the imager. The Bayer filter array samples the green information on a quincunx grid and the red and the blue information on a rectangular grid. A representative example of a Bayer filter suitable for the present embodiments is illustrated in FIG. 3. In FIG. 3, "R" represents a red color filter element, "G" represents a green color filter element, and "B" represents a blue color filter color filter element. As shown, the green information is sampled at a higher frequency. This is because the peak sensitivity of the human visual system lies in the medium wavelengths.

While the embodiments above are described with a particular emphasis to Bayer filter, it is to be understood that more detailed reference to Bayer filter is not to be interpreted as limiting the scope of the invention in any way, and that other color filter arrays are not excluded from the scope of the present invention.

The missing color information of the colors that are filtered out of an individual pixel can be interpolated by a process known as "demosaicing" using the color values of neighboring pixels. When the imaging devices have electronic-calculation functionality, the demosaicing process for each imaging device can be performed, partially or completely by the respective imaging device. The demosaicing process can also be performed by a computer system 20 supplemented by a program of instructions executable by a computer system 20 to perform the demosaicing process.

The imaging device optionally and preferably has electronic calculation functionality, such as an associated processor, that allows it to automatically perform various operations before, during or after image capture. Representative examples of at least some of these operations including, without limitation, Automatic Exposure Control (AEC), Automatic White Balancing (AWB) and the like. Typically, the imaging device also performs at least one operation selected from the group consisting of Automatic Gain Control (AGC) and Automatic Black Level Control (ABLC).

In AEC, the imaging device automatically selects the exposure time based on the lighting condition, without user intervention. For given light conditions and lens aperture, there is an optimum exposure time that produces desirable pictures. An exposure time longer than optimum results in an image that is overly bright (Saturated), and it will look washed out. An exposure time shorter than the optimum time results in an image that is too dark (noisy) and difficult to view.

For achieving AEC, the associated processor can perform a histogram analysis on a signal strength measured at all the locations in a picture using multiple preliminary frames. In some embodiments, the actual frame mean is determined and compared with a desired frame mean. If the actual frame mean is less than the desired mean, then the exposure time is increased; otherwise, the exposure time is decreased. In some embodiments, all the pixels within some region-of-interest are sorted into different brackets depending on their brightness. The number of pixels that are unacceptably bright and the number of pixels that are unacceptably dark are counted. An incremental adjustment to the exposure setting is applied so as to balance the number of pixels that are too dark with those that are too bright.

In AWB the associated processor multiplies the individual colors (e.g., red, green and blue colors, when an RGB color system is employed) by certain coefficients, known as white balance WB parameters. Since pixels of different colors generally have different light sensitivity, they oftentimes produce different signal levels even if incident light is white (for example, light having equal components of red, green and blue). As a result, a white object in the scene does not appear white without further processing. The use of WB parameters allows to artificially adjust the levels of pixels of different colors so that the image of a white object appears white in a picture.

For achieving AGC, the imaging device includes an AGC circuit that processes the analog video from the imager to scale the analog signal before the signal is digitized. Typically, the AGC circuit receives an analog voltage from the imager and generates a temperature compensated gain voltage.

ABLC (also known as Automatic Black Level Calibration) can be executed by the imaging device using an analog circuit which processes the signal from the imager before it is being digitized and/or an associated processor which performs digital signal processing. Generally, the imaging device sets a threshold, also known as the black level set point that is slightly greater than the read noise. In some embodiments of the present invention the imaging device calibrates the black level for every field using extra pixel rows that are shielded from incident light.

All the above automatic operations are known to those skilled in the art of digital imaging and are already implemented in many types of pixelated imagers.

Representative examples of a characteristic wavelength range detectable by the imaging devices include, without limitation, any wavelength from about 400 nm to about 1100 nm, or any wavelength from about 400 nm to about 1000 nm. In some embodiments of the present invention the imaging devices also provide signal responsively to light at the ultraviolet (UV) range. In these embodiments, the characteristic wavelength range detectable by the imaging devices can be from about 300 nm to about 1100 nm. Other characteristic wavelength ranges are not excluded from the scope of the present invention.

In various exemplary embodiments of the invention one or more of the imaging devices comprises a rolling shutter. Rolling shutters are typically employed in pixelated imagers, such as CMOS imagers. In a CMOS imager, each pixel typically has both a photodetector and an active transistor circuitry for readout of the pixel signal. The photodetector for each pixel converts photons impinging on the pixel to an electric charge via the photoelectric effect. The charge is integrated over a period of time that is long enough to collect a detectable amount of charge but short enough to avoid saturating storage elements. This period is analogous to a film exposure time (the shutter speed) and is termed the "integration time". In a CMOS imager, the integration time is the time between a reset of a given row and a subsequent read of the row, and the rolling shutter executes a routine in which the reset/read is sequential (row by row). This routine is referred to herein as a "sensing sequence".

It is appreciated that the imager can provide video data or pixel data according to different data formats corresponding to a specific manufacturer of the imager. A side link layer can provide a set of digital logics that convert different types of pixel data into a desired video data format. For example, an imager according to some embodiments of the present invention can have a line valid port through which a timing circuit provides a line valid signal which conveys information on when the imager is transmitting pixel data for each particular line in an image frame. An imager can also have a frame valid port through which the timing circuit provides a frame valid signal which conveys information on when the imager is transmitting pixel data for an image frame. An imager can also have a pixel clock port through which the timing circuit provides a pixel clock signal. The clock signal may be used in transmitting (e.g., clocking) line valid and/or frame valid signal.

When system 10 comprises more than one imaging device (e.g., two imaging devices 12a and 12b as schematically illustrated in FIG. 1), the imaging devices optionally and preferably provide partially overlapping field-of-views 16a and 16b of scene 14. The overlap between field-of-views 16a and 16b is generally shown at 16c. Overlap 16c allows system 10 to combine field-of-views 16a and 16b, thereby to image scene 14, by its entirety. In various exemplary embodiments of the invention the spacing between imaging devices 12a and 12b is selected to allow system 10 to constructing a three-dimensional reconstruction of scene 14, using the a imaging technique as known in the art.

In some embodiments of the present invention system 10 comprises one or more infrared light source constituted for illuminating at least part of scene 14. Shown in FIG. 1 are two infrared light sources 18a and 18b, but it is not intended to limit the scope of the present invention to a system with two infrared light sources. Thus, the present embodiments contemplate configurations with one infrared light source or more than two (e.g., 3, 4, 5 or more) infrared light sources. Herein, unless explicitly stated, a reference to infrared light sources in the plural form should be construed as a reference to one or more infrared light sources.

The infrared light source can be of any type known in the art, including, without limitation, light emitting diode (LED) and a laser device.

The infrared light sources generate infrared light at a wavelength detectable by the imaging devices. The infrared light sources are optionally and preferably positioned adjacent to at least one of the imaging devices. In the representative illustration of FIG. 1, which is not to be considered as limiting, source 18a is adjacent to device 12a and source 18b is adjacent to device 12b. However, this need not necessarily be the case, since, for some applications, it may not be necessary for the light sources to be adjacent to the imaging devices. Further, although FIG. 1 illustrates two imaging devices and two light sources, this need not necessarily be the case; the number of light sources is not necessarily the same as the number of imaging devices.

The light sources can provide infrared illumination in more than one way. In some embodiments of the present invention one or more of the light sources provide flood illumination, and in some embodiments of the present invention one or more of the light sources generates an infrared pattern.

As used herein, "flood illumination" refers to illumination which is spatially continuous over an area that is illuminated by the illumination.

Flood illumination is useful, for example, when scene 14 is at low ambient light conditions, and it is desired to increase the amount of light reflected back from the scene in the direction of the imaging device.

Figure 2A:
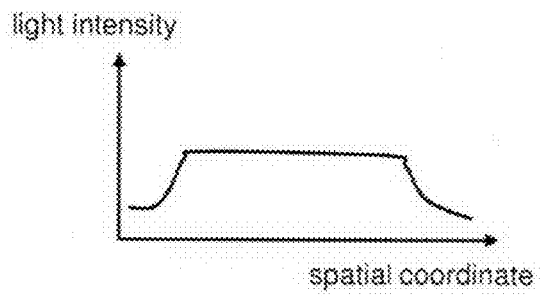
FIGS. 2A-E are schematic illustrations of intensity profiles (FIGS. 2A-D) and spatial light distribution (FIG. 2E) of various infrared illuminations according to some embodiments of the present invention.

In some embodiments of the present invention the intensity of the infrared light provided by the light sources is generally uniform in the area that is illuminated by flood illumination, with the exception of deviation from uniformity at the periphery of the area. A representative example of an intensity profile suitable for this embodiment is illustrated in FIG. 2A.

Figure 2B:
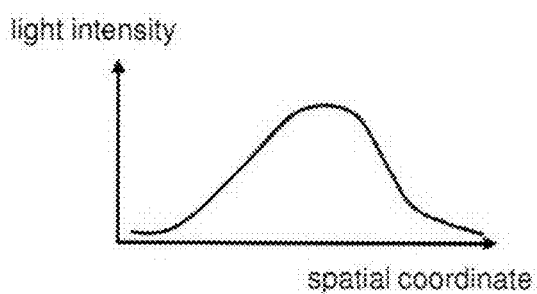

In some embodiments, the intensity of the infrared light provided by the light sources has a single pick at some region (e.g., a central region) in the area that is illuminated by flood illumination. A representative example of an intensity profile suitable for this embodiment is illustrated in FIG. 2B.

Figure 2C:
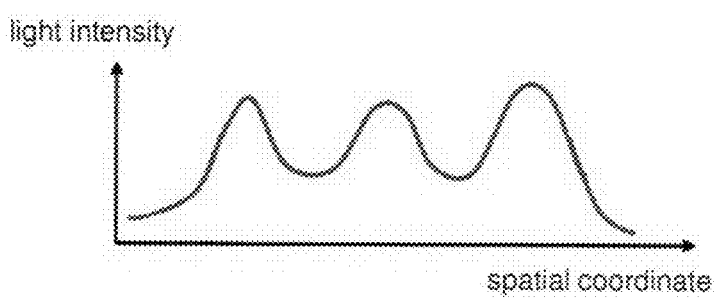

In some embodiments of the present invention one or more beam shaping elements (not shown) are employed to shape the beam of the infrared flood illumination. The beam shaping is optionally and preferably selected to provide different intensity profiles along the vertical and horizontal field-of-views of the imaging device(s). For example, in the vertical direction, a predetermined percentage (e.g., from about 30% to about 70% or from about 40% to about 60%, say about 50%) of the light flux can be provided into a predetermined angular aperture (e.g., from about 10° to about 30° or from about 15° to about 25°), preferably symmetrically with respect to the vertical center of the field-of-view. In the horizontal direction, the intensity profile can, in some embodiments of the present invention, have a plurality of peaks. A representative example with three peaks is illustrated in FIG. 2C. The peaks can have a relative level of from about 30% to about 70% or from about 40% to about 60%, e.g., about 50%.

As used herein, "infrared pattern" refers to infrared illumination which is non-continuous and non-uniform in intensity over at least a central part of the area that is illuminated by the illumination.

Figure 2D:
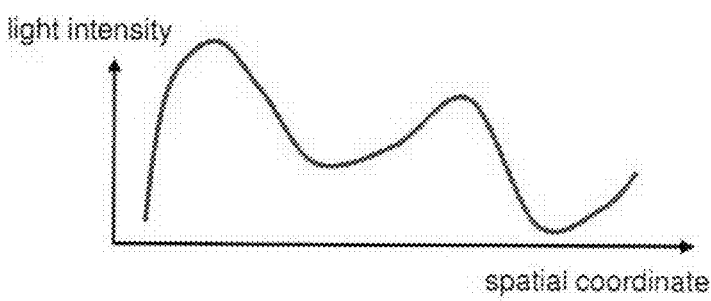

Infrared pattern is useful, for example, when it is desired to add identifiable features to the scene. The pattern typically includes a plurality of distinct features at horizontal and vertical angular resolutions of from about 0.2° to about 2° or from about 0.5° to about 1.5°, e.g., about 1°. In computer vision applications employing a CMOS imager, horizontal and vertical angular views of 1° each typically corresponds to about 20×20 pixels of the imager. A representative example of an intensity profile of a single feature of an infrared pattern suitable for some embodiments of the present invention is illustrated in FIG. 2D. A complete pattern thus includes a plurality of features, wherein at least two of the features have an intensity profile similar to the profile illustrated in FIG. 2D.

Figure 2E:
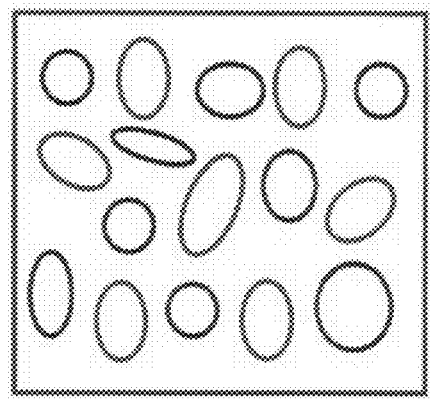

FIG. 2E is a schematic illustration of a representative example showing a spatial distribution of light suitable for use at an infrared pattern according to some embodiments of the present invention. Additional techniques useful for providing light pattern suitable for the present embodiments are provided hereinunder.

Different types of illumination can be provided at different times by the same light source. Alternatively, different light sources can be configured to provide different types of illuminations.

When system 10 comprises a light source that generates an infrared pattern, the infrared pattern is optionally and preferably projected onto one or more field-of-view overlaps (e.g., overlap 16c) so as to facilitate three-dimensional reconstruction, or stitching of two or more images, as desired. In these embodiments, system 10 preferably comprises a computer system 20 which receives image data pertaining to infrared and visible light acquired by the imaging devices, wherein the image data comprises infrared pattern as acquired by two or more imaging devices. Computer system 20 computes three-dimensional information of scene 14 or stitches the partial field-of-views acquired by the respective imaging devices (e.g., field-of-view 16a and field-of-view 16b) to a combined field-of-view which is larger than each individual field-of-view.

In various exemplary embodiments of the invention at least one of the infrared light sources is activated and deactivated, preferably repeatedly, thus generating an infrared pulse sequence. This can be done using a controller 22 that can be provided as a standalone device (for example, a dedicated electronic circuit) or as part of computer system 20.

In embodiments in which a rolling shutter is employed, controller 22 optionally and preferably synchronizes between the infrared pulse sequence and the sensing sequence of the rolling shutter. A representative example of such synchronization is illustrated in FIG. 4A. Shown in FIG. 4A are row reset, exposure and readout times of a two successive frames denoted frame N and Frame N+1. The sensing sequence of the rolling shutter (row exposure time) is illustrated as thick horizontal bars and infrared pulse sequence is illustrated as thick vertical bars. As shown, the sensing sequence in Frame N is synchronized with the infrared pulse sequence.

In some embodiments of the present invention synchronization is applied for some of the frames, while other frames are operated at a readout scenario which does not include infrared pulses. In FIG. 4A, Frame N+1 is a representative example of a frame readout scenario without infrared pulses. As shown, the exposure times in Frame N+1 are considerably longer than those in Frame N.

In some embodiments, controller 22 synchronizes between the infrared pulse sequence and the frame sequence. In these embodiments, for at least one frame, the infrared light source is active during the entire frame time of the respective frame.

Figure 4B:
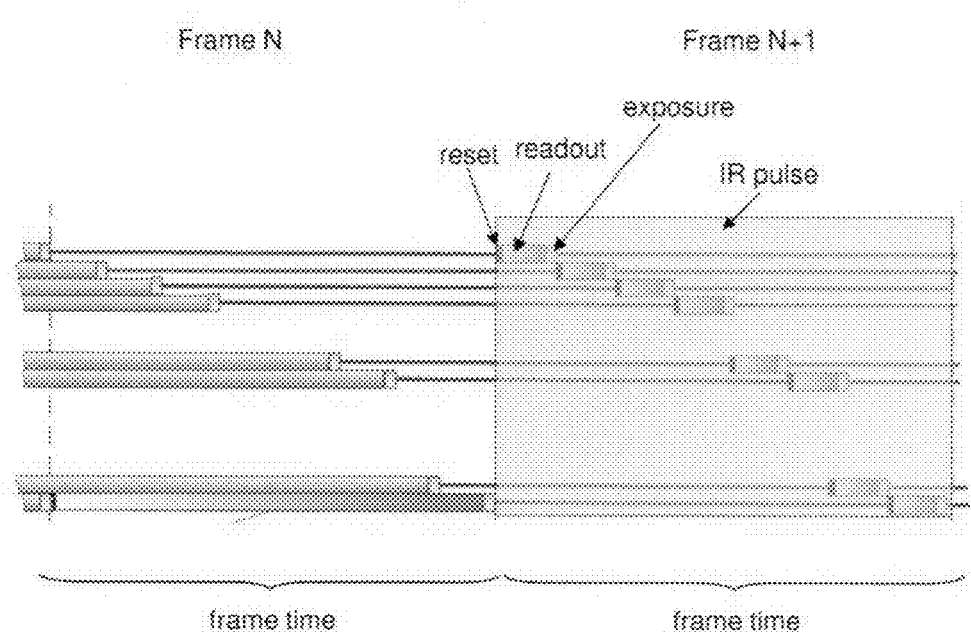

A representative example of such synchronization is illustrated in FIG. 4B. Shown in FIG. 4B are row reset, exposure and readout times of a two successive frames denoted frame N and Frame N+1. An infrared pulse is applied during the frame time of Frame N+1, but not during Frame N.

As used herein, the frame time, denoted FT is defined as the overall time required to complete data reading from all the pixels of the imager.

When the readout from the imager is via a rolling shutter, FT can be defines as the number of lines multiplied by the row activation time, which include the row reset time, row exposure time, and row readout time.

The reciprocal of the frame time FT is referred to herein as the frame rate and denoted FR. Thus, FR=1/FT.

Figure 4C:
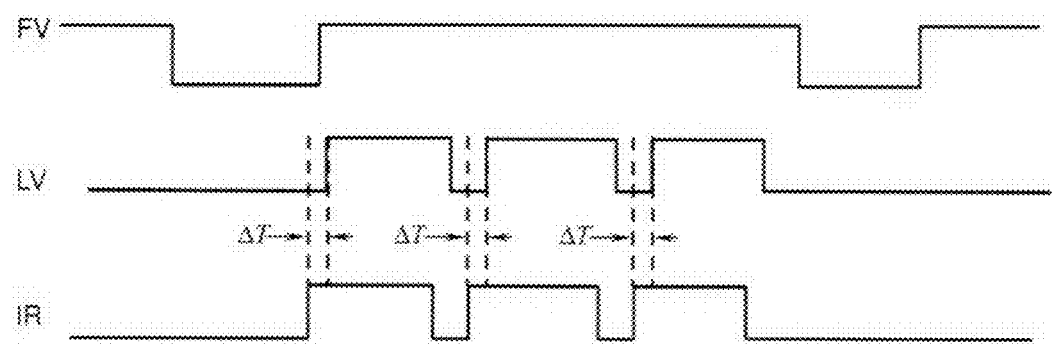

In some embodiments, controller 22 is configured to offset the infrared pulse sequence with respect to the line valid signal of the imaging device, such that an onset of an infrared pulse precedes an onset of a line valid signal pulse by a predetermined time offset $\Delta T$. Preferably, the time offset is the same for all line valid onsets of the line valid signal. A representative illustration of these embodiments is shown in FIG. 4C, depicting a frame valid signal (FV), a line valid signal (LV) and an infrared pulse sequence (IR). It was found by the present inventor that the synchronization is significantly improved when there is such an offset an imager such as a CMOS imager. The value of the time offset $\Delta T$ depends on the properties of the imager. In some embodiments $\Delta T$ is less than the duration of a line valid pulse, in some embodiments $\Delta T$ equals the duration of a line valid pulse, and in some embodiments $\Delta T$ is above the duration of a line valid pulse. In the schematic illustration of FIG. 4C, which is not to be considered as limiting, $\Delta T$ is less than the duration of a line valid pulse. One of ordinary skills in the art, provided with the details described herein would know how to adjust FIG. 4C for the case in which $\Delta T$ is not less than the duration of a line valid pulse.

Controller 22 can also synchronize between the operations of the individual imaging devices.

In some embodiments of the present invention one imaging device serves as a master and the other imaging device serves as a slave, wherein controller 22 performs synchronization between the master and the slave.

In some embodiments of the present invention a synchronization device which can include a dedicated electronic circuit serves for synchronizing the operation of the controller and all imaging devices.

This synchronization is particularly advantageous when it is desired to combine the images acquired by different imaging devices, for example, for generating a three-dimensional reconstruction or for stitching. In these embodiment, the operations of the imaging devices are optionally and preferably synchronized such that images of at least one feature, more preferably a plurality of features in scene 14 are captured generally simultaneously (e.g., within 1 microsecond or within 500 ns or within 250 ns or within 125 ns or within 60 ns or within 30 ns or within 15 ns or less, e.g., within 1 ns). In various exemplary embodiments of the invention the operations of the rolling shutters of two or more imaging devices are synchronized by controller 22 such that row readout of one imaging device is generally simultaneous with the row readout of another imaging device. Preferably the simultaneous readouts are of equivalent rows, e.g., rows having the same relative position with the imager matrices.

Figure 5:
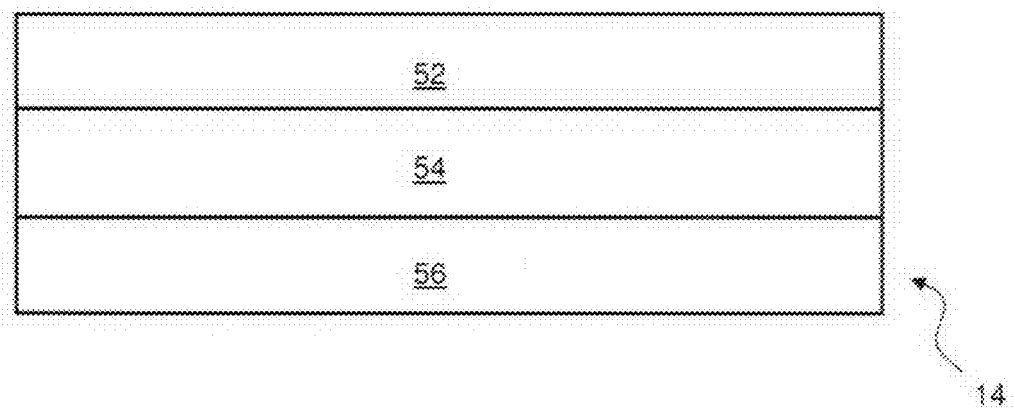
FIG. 5 is a schematic illustration of regions of a scene illuminated according to some embodiments of the present invention by different infrared light sources.

In some embodiments, each of at least some of the infrared light sources is constituted to illuminate a predetermined region with scene 14. This embodiment is illustrated in FIG. 5. Shown in FIG. 5 are three regions 52, 54 and 56 within scene 14. The regions are shown as non-overlapping regions but this need not necessarily be the case, since, for some applications, two or more regions partially overlap each other. Each of regions 52, 54 and 56 is preferably illuminated by one of the infrared light sources (when the respective light source is active). Optionally and preferably the activation and deactivation of the respective infrared light source is synchronized with the temporal field-of-view provided by rolling shutter(s). Specifically, since the rolling shutter performs sequential reading and resetting across the imaging device, the field-of-view of the imaging device at a particular time instant includes the regions with the scene to which the active pixels of the imager are exposed. This field-of-view is referred to as "temporal field-of-view." At any given time instant, the temporal field-of-view is narrower than the full field-of-view of the imager, since the full field-of-view includes all regions to which the pixels are exposed from the initiation to the completion of the sensing sequence, wherein the temporal field-of-view includes only regions to which the pixels are exposed at the respective time instance.

Thus, suppose, for example, that during a particular time interval $\Delta t_a$ beginning at time $t=t_1$ and ending at time $t=t_2$ the temporal field-of-view of the imager spans over region 52 or part thereof, that during another time interval $\Delta t_b$ beginning at time $t=t_2$ and ending at time $t=t_3$ the temporal field-of-view of the imager spans over region 54 or part thereof, and that during an additional time interval $\Delta t_c$ beginning at time $t=t_3$ and ending at time $t=t_4$ the temporal field-of-view of the imager spans over region 56 or part thereof. In this example, the infrared light source that is constituted to illuminate region 52 is activated during time interval $\Delta t_a$ and is kept deactivated during time intervals $\Delta t_b$ and $\Delta t_c$; the infrared light source that is constituted to illuminate region 54 is activated during time interval $\Delta t_b$ and is kept deactivated during time intervals $\Delta t_a$ and $\Delta t_c$; and the infrared light source that is constituted to illuminate region 56 is activated during time interval $\Delta t_c$ and is kept deactivated during time intervals $\Delta t_a$ and $\Delta t_b$.

In some embodiments of the present invention the deactivation of one region and the activation of the second region are synchronized with a time period which includes the combined readout time of the last line of the first region and the reset time of the first line of the second region. The advantage of such synchronization is that it reduces or eliminates image sensing of time overlapping of the illumination of the two regions.

The activation and deactivation of the light sources in synchronization with the temporal field-of-view provided by the rolling shutter can be performed by the imaging devices or by controller 22. This can be done both for flood illumination and for an infrared pattern. In some embodiments of the present invention the activation and deactivation is applied simultaneously for flood illumination and for an infrared pattern.

In various exemplary embodiments of the invention system 10 has a plurality of operation modes, and controller 22 is configured for selecting an operation mode from the plurality of operation modes. Based on the selected operation mode, controller 22 can select, for example, the percentage of frames for which the infrared illumination is synchronously applied, or the partial frame rate of each frame type or the sequence of the frame type within a period of time, or the duty cycle of the infrared pulses or the duration of the IR illumination.

The present embodiments contemplate several operation modes for system 10. In a first operation mode, at least one infrared light source, more preferably all the infrared light sources are not activated. For example, in some embodiments, all the images are acquired using light reflected from the scene, without activating the infrared light sources. This operation mode can be selected when the ambient illumination is sufficient for acquiring images using two or more imaging devices and combining the images.

In various exemplary embodiments of the invention controller 22 automatically selects the first operation mode based on the ambient illumination conditions. For example, computer system 20 can receive from the imaging device(s) brightness level and determine, based on the brightness level, whether the ambient illumination is sufficient for acquiring images using two or more imaging devices and combining the images. If the ambient illumination is sufficient, controller 22 selects the first operation mode. An indication that the ambient illumination is sufficient can be, for example, an indication from the imaging device, in the absence of infrared illumination, that the exposure time is less than the frame time.

In the first operation mode the computer system receives from the imaging devices imaging data, typically corresponding to acquisition of visible and IR light from the scene, and uses the data for performing three-dimensional reconstruction of the scene or part thereof. In some embodiments of the present invention the computer system uses the data for performing gaze tracking procedure for tracking a gaze of an individual in the scene, and/or object recognition procedure for recognizing at least one object in the scene. Computer programs for executing these procedures are known in the art and found, for example, in Qingxiong Yang, "Spatial-Depth Super Resolution for Range Images, "IEEE Conference on Computer Vision and Pattern Recognition, 2007, pages 1-8. H. Hirschmuller, "Stereo Processing by Semiglobal Matching and Mutual Information," IEEE Transactions on Pattern Analysis and Machine Intelligence, 2008, 30(2):328-341.

In a second operation mode, at least one infrared light is activated to generate flood infrared illumination. This operation mode can be selected when the ambient visible illumination is insufficient, or when it is desired to capture infrared images. The intensity of the infrared illumination in this operation mode is preferably high so as to allow capturing sufficient information from the scene using infrared light. The infrared illumination is optionally and preferably synchronized with the exposure time of each line as further detailed hereinabove. In turn, the exposure time is significantly reduced (typically to less than 20 μs e.g., 10-15 μs) so as to increase the infrared signal relative to the background ambient light. This synchronization allows short pulse duration of the infrared light (of order of 10 μs). Optionally and preferably, the duty cycle of the infrared pulse sequence is from about 30% to about 50%. Short pulse duration and relatively low duty cycle allows the infrared light source to be overdriven at high current. It was found by the present inventor that the current can be increased to a level that is about three times higher than the allowed current for CW light. For Example a 1 Watt infrared LED is typically driven by a 350 mA yields 0.4 Watts of infrared light at when operating at CW mode. According to some embodiments of the present invention the infrared light source can be driven by current of 500-2000 mA at a pulse duration of about 10 µs and duty cycle of 30%-50% to provide 2 Watts of infrared light.

In various exemplary embodiments of the invention controller 22 automatically selects the second operation mode based on the ambient illumination conditions. If the ambient illumination is insufficient, controller 22 selects the second operation mode. An indication that the ambient illumination is insufficient can be, for example, an indication from the imaging device, in the absence of infrared illumination, that the exposure time is not less than the frame time. For example, when the brightness level indication from the imaging device is lower than a predetermined threshold (for example less than 40) and/or when the gain level indication from the imaging device is above a predetermined threshold, (for example, above 1.1), controller 22 selects the second operation mode.

Optionally and preferably controller 22 also increases the duty cycle of the infrared pulse sequence.

In the second operation mode the computer system receives from the imaging devices imaging data, typically corresponding to acquisition of infrared light from the scene, and uses the data for performing at least one of: (i) gaze tracking of an individual in the scene, (ii) three-dimensional reconstruction of the scene or part thereof, and (iii) an object recognition procedure for recognizing at least one object in the scene.

In a third operation mode, at least one infrared light is activated to generate an infrared pattern at least at the overlap between the field-of-views. The exposure time per row in this mode is optionally and preferably selected based on the intensity and duration of the infrared pattern, so as to capture the infrared pattern at sufficient contrast.

In the third operation mode, the computer system receives from the imaging devices imaging data, typically corresponding to acquisition of infrared light from the scene, and uses the data for performing at least one of: (i) gaze tracking of an individual in the scene, and (ii) three-dimensional reconstruction of the scene or part thereof.

Optionally, an object recognition procedure is also executed in the third mode.

In some embodiments of the present invention computer system 20 calculates a disparity score characterizing the disparity between image data corresponding to one imaging device and image data corresponding to another imaging device. The disparity score can include the number of matched pixels in the image data. Controller 22 can automatically select the operation mode base on the disparity score. For example, when the disparity score is low, controller 22 can select the third operation mode.

In various exemplary embodiments of the invention controller 22 dynamically interweaves at least two of the modes of operations during the operation of the imaging devices, wherein one of the first, second and third modes is employed for each frame.

The percentage of frames for each operation mode, can be selected based on the ambient illumination, wherein high percentages for the first mode are used for ambient illumination of high intensity, and lower percentages for the first mode are used for ambient illumination of lower intensity. A representative percentage for the first operation mode is from about 30% to about 70%. For example, for an imaging device having a nominal frame rate of about 60 frames-per-second (fps), the number of frames per second that are allocated for the first mode is from about 18 frames to about 42 frames.

A representative percentage for the second operation mode is, without limitation, from about 40% to about 60%, e.g., about 50%. In some embodiments of the present invention controller 22 varies at least one of the percentage of frames allocated for the second mode and a power of infrared light source to maintain a signal-to-noise ratio (SNR) within a predetermined SNR range. The SNR for a given illumination and frame rate can be obtained, for example, from the imagers in the imaging devices. Alternatively, or additionally, the SNR can be calculated by the computer system.

For the second mode, when gaze tracking is preformed, the percentage of frames rate allocated for this mode is optionally and preferably higher than when three-dimensional reconstruction or object recognition are performed. The increment of the percentage of frames for gaze tracking can be in response to a command received from the operator, or it can be in response to image processing performed by the computer system. For example, the computer system can be configured to detect a gesture of one or more individual in scene (e.g., when the individual places his or her hand on a particular object such as the head or face), and the controller can vary the percentage of frames responsively to the gesture detection.

The percentage of frames allocated for the third operation mode is preferably low. The value of this percentage can be selected based on the type of the infrared pattern, wherein for patterns having higher average intensity over the area of the pattern the percentage is higher, and vices versa. A representative percentage for the third operation mode is, without limitation, from about 5% to about 15%, e.g., about 10%.

The present embodiments also contemplate selecting the percentage of frames allocated for each operation mode based on the illumination condition, optionally and preferably the ambient illumination condition. In these embodiments, computer system 20 determine the illumination condition as further detailed hereinabove and controller 22 selects the percentage of frames allocated for each operation mode responsively to the illumination condition.

Some embodiments of the present invention provide a light pattern device suitable for generating a light pattern that illuminates objects in a scene captured by an image capturing device. The light pattern device of these embodiments can be used with, or be part of any imaging system, including, without limitation, system 10. For example, the light pattern device can be, or be embedded in, light source(s) 18a and/or 18b of system 10.

The module encompassing the light pattern device of the present embodiments provides a light pattern and has relatively compact dimensions. In some embodiments of the present invention the light pattern device is also power efficient and relatively cheap.

Figure 6:
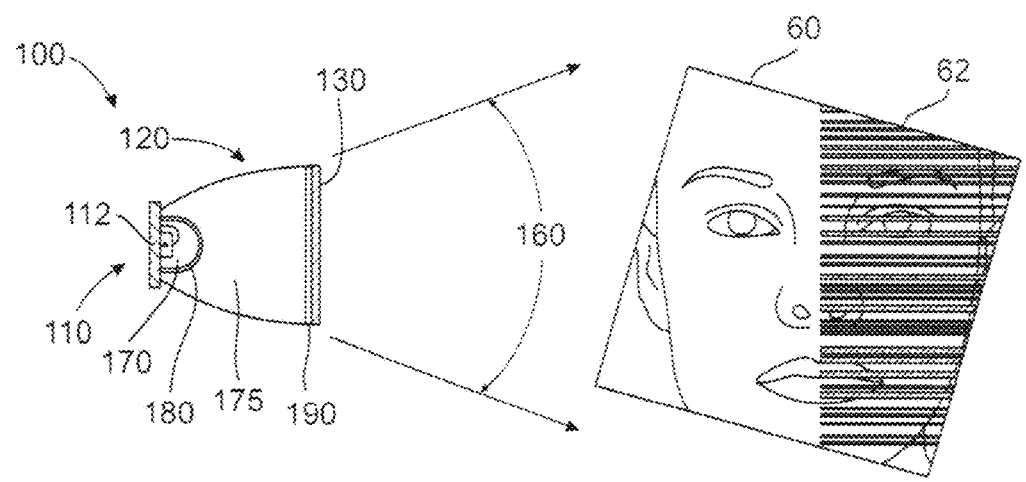
FIG. 6 is a schematic illustration of a light pattern device according to some embodiment of the present invention.

FIG. 6 is a schematic illustration of a light pattern device 100 according to some embodiment of the present invention. Light pattern device 100 includes a monolithic package that packs together a light source 110 that generates light that is emitted from the device and illuminates the objects at the scene 60. Light source 110 may comprise an array of individually controllable light sources. The monolithic package further packs an optical element 120 that collects the light generated by the light source and transmits it through a spatial light modulator 130 to illuminate object 60 at the surrounding scene. Spatial light modulator 130 spatially modulates the light from light source 110 and projects an angular aperture 160 on objects 60 at the scene resulting in projected light patterns 62. Projected light patterns 62 result from patterns provided by any of light source 110 or a surface 115 thereof, optical element 120 or spatial light modulator 130. Projected light patterns 62 may then be detected within the image that is captured by a camera as explained above using image processing means. For example, projected light patterns 62 may comprise lit and dark areas or striped.

In various exemplary embodiments of the invention all elements of light pattern device 100 are integrated together to yield a monolithic device. Specifically, all the parts of light pattern device 100 are assembled together to provide a unit module that has all the required interfaces for its operation.

Spatial light modulator 130 may be any optical element that may use refractive or diffractive optical phenomena, such as lens, Fresnel lens, micro lens array, optical prism foil, holographic element, spatial filter etc. The projected light patterns 62 may be a result of the emitted light interference effect with spatial light modulator 130. Such effects may be diffraction or refraction or a reflection of the light spatial distribution from light source 110 or any combination of both effects.

The type of light source 110 is defined according to the required light wavelength, the required illumination intensity on the object and the spatial light modulator 130. The light source may be any type of light source, possibly based on a semiconductor such as light emitting diode (LED) packaged or un-packaged die, or a laser produced by any laser diode (LD) or any vertical-cavity surface-emitting laser (VCSEL) packaged or un-packaged die. The elements of light source 110 include the necessary interface that is needed for its operation such as electrical interface to supply the electrical power, Heat dissipation interface for removing the heat which may be generated during its operation.

For example spatial light modulator 130 may be an optical lens that magnifies the image of a spatial structure of a light source surface 115 of light source 110 that is facing the spatial light modulator 130. Furthermore spatial light modulator 130 may comprise an element that has diffractive capabilities such as micro lenses or micro prisms even if light source 110 emits light that has negligible or no coherence. Spatial light modulator 130 is designed to perform the required pattern illumination with no dependency on the coherency level of light source 110.

Optical element 120 provides the mechanical interface that holds light source 110 in its position relative to spatial light modulator 130. Furthermore optical element 120 may provide the required relative position of light source surface 115 relative to spatial light modulator 130 in order to ensure the illuminated of projected light patterns 62 at angular aperture 160. For example, if spatial light modulator 130 is an optical lens that magnifies the image of the spatial structure of light source surface 115, then optical element 120 may hold the optical lens (spatial light modulator 130) at the required distance from light source surface 115 in order to perform the image magnification as light patterns 62 which are projected on objects 60 with a highly focus state.

This embodiment projects an image of the structure on light source surface 115 as pattern 62 on the object 60.

Light source surface 115 may be part of the LED die top surface that may include the conductor, pads and the wire bonding. Optionally, light source surface 115 may comprise additional elements like additional conducting or pads to provide more details pattern on the scene.

In embodiments, spatial light modulator 130 may be integrated into device 100 below optical element 120, such that optical element 120 is on top of device 100, to provide protection of a more delicate or vulnerable spatial light modulator 130.

Optical element 120 provides the optical interface between light source 110 and spatial light modulator 130. For example, optical element 120 may comprise an encapsulation material 170 which may encapsulate the light source die 112 wire bonds and may have a dome shape. This encapsulation enhances the light extraction from the light source die 112. Optical element 120 may also comprise a translucent material having a shape that may act as an optical funnel 175 like CPC (compound parabolic concentrator) that guides the emitted light from light source 110 toward spatial light modulator 130. Furthermore, optical element 120 may incorporate elements 180 and 190 made of an index matching material that matches the refractive index of the light source encapsulation material 170 and/or of spatial light modulator 130 material. This index matching material may be located at the interfaces of the encapsulation material 170 or the spatial light modulator 130 with the translucent material 175 in order to have a continued optical translucent material structure with similar refraction index. This continued optical translucent material structure provides the monolithic structure of the light pattern device 100.

Figure 7:
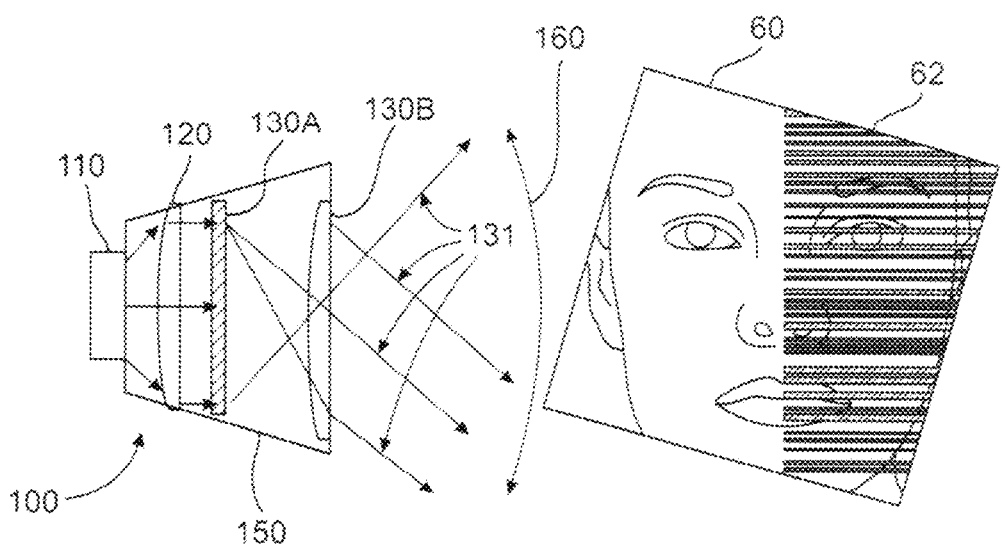
FIG. 7 is a schematic illustration of a light pattern device having a projection lens and a pattern slide as a spatial light modulator according to some embodiments of the present invention.

FIG. 7 is a schematic illustration of a light pattern device 100 having a projection lens 130B and a pattern slide 130A as spatial light modulator 130 according to some embodiments of the present invention. The monolithic package 150 in this embodiment includes a light source 110, one or more collimating lens as optical element 120, the lens collimating the emitted light form light source 110 so that it passes through pattern slide 130A that spatially modulates the light in terms of intensity.

Pattern slide 130A scatters the incident light to light rays 131 at an angular distribution that enables the light to pass through projection lens 130B and to project patterns 62 on object 60 at the required distribution angle 160. Pattern slide 130A may be made of transparent substrate material and have the pattern structure e.g. printed onto its face. Pattern slide 130A may have scattering capabilities. A suitable substrate for such slide may for example be a transparent diffuser or a holographic diffuser.

Light rays 131 are projected via projection lens 130B onto objects 60 in the scene, to yield projected light patterns 62. Light source 110 may generate light at a broad spectral range and the pattern mask may spatially modulate the light in terms of wavelengths. The scattering effect of pattern slide 130A may be dependent on the light wavelength. The elements of light source 110 include the necessary interface that is needed for its operation such as electrical interface to supply the electrical power, Heat dissipation interface for removing the heat which may be generated during its operation.

Figure 8:
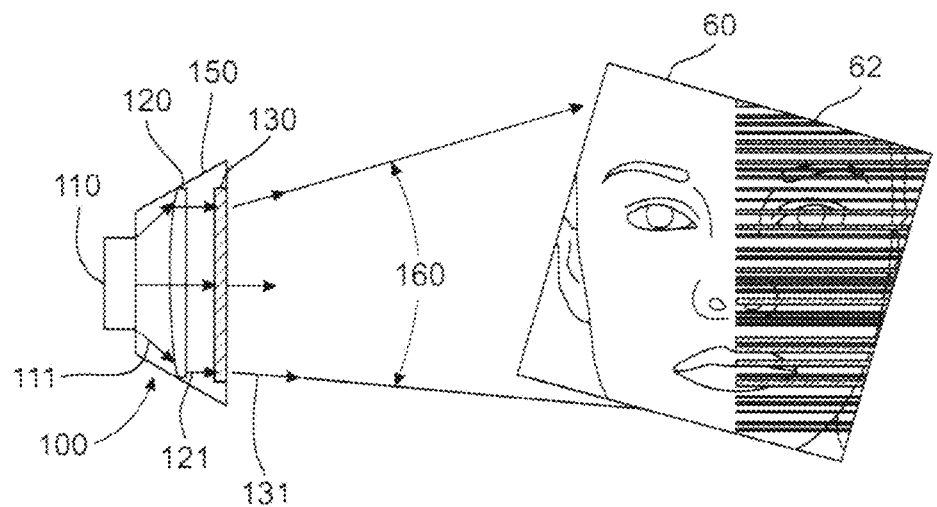
FIG. 8 is a schematic illustration of a light pattern device having diffractive optics element according to some embodiments of the present invention.

FIG. 8 is a schematic illustration of a light pattern device 100 having diffractive optics element 130 (DOE) according to some embodiments of the present invention. In light pattern device 100, monolithic package 150 packs together a light source 110, collimating lens 120 that collimates the emitted light to pass through a diffractive optics element 130 (DOE) that spatially modulates the light in terms of intensity wavelength and angular distribution. Then the light is illuminated at angular aperture 160 on objects 60 at the scene resulting in projected light patterns 62. The elements of light source 110 include the required interface that is needed for its operation such as electrical interface to supply the electrical power, heat dissipation interface for removing the heat which may be generated during its operation.

In embodiments, monolithic light pattern device 100 comprises package 150, an illumination structure comprising an array of individually controllable light sources 110 with optional optical elements such as collimating lens 120, and optical element 120 (e.g. a collimating lens, a diffractive optics element DOE, or a micro lens array (MLA)) that is integrally produced upon the illumination structure. The illumination structure and the optical element are packed together in package 150, forming a monolithic device.

Illumination structure 110 may be arranged to yield a first illumination pattern 111, which is collimated by collimating lens 120 and transformed to second collimated illumination pattern 121, while optical element 130 is arranged to define and control illumination by illumination structure 110 to transform second collimated illumination pattern 121 into a third illumination pattern 131 that is directed at illuminated object 60 in the scene. Third illumination pattern 131 may already comprise light patterns 62.

In embodiments, illumination structure 110, embodied as an array of light sources such as LEDs, may be divided into separated LED branches where each branch can be operated independently. Every branch may be designed to illuminate a different region on the scene. Optical element 130 such as the lens, DOE or the MLA may be arranged to support this regional illumination, possibly with some overlapping between regions.

Figure 9:
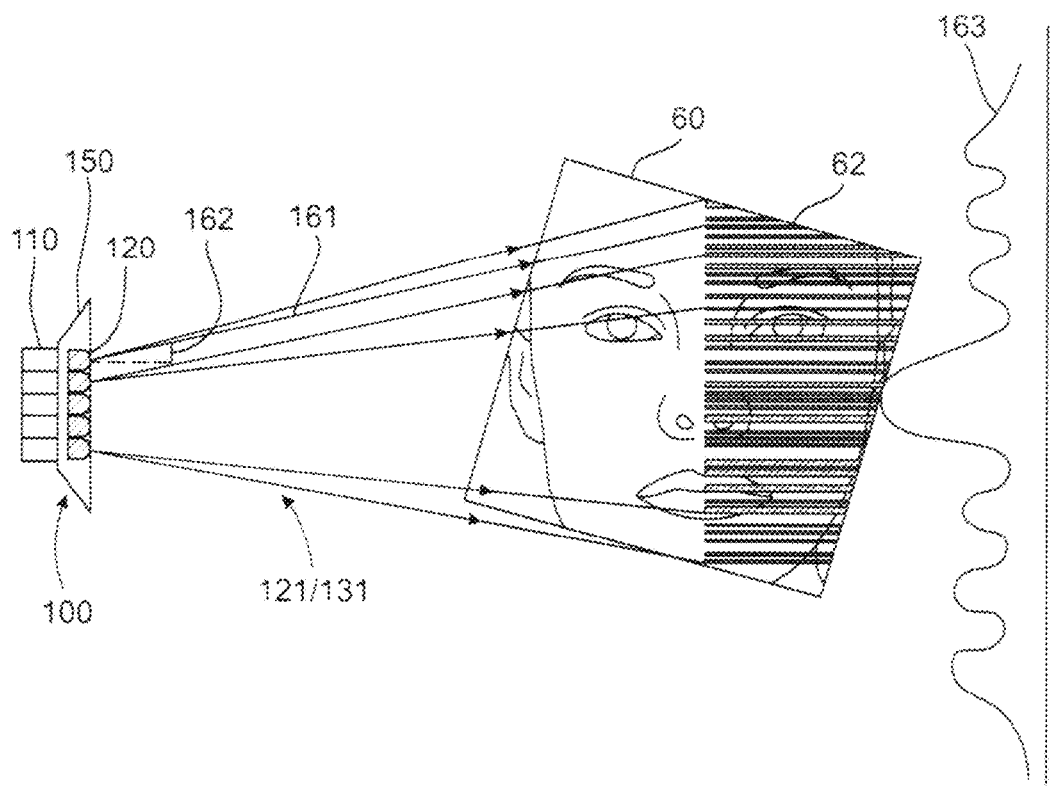
FIG. 9 is a schematic illustration of a light pattern device having an array of light sources and a micro lens array according to some embodiments of the present invention.

FIG. 9 is a schematic diagram illustrating light pattern device 100 having a light sources array 110 (possibly but not necessarily LED array) and micro lens array (MLA) as optical element 120 according to some embodiments of the present invention. In light pattern device 100, monolithic package 150 packs together an array of light sources array 110, and micro lens array 120 (MLA) that spatially modulates the light emitted from light sources array 110 to form a spatial illumination pattern. Then the light is illuminated at angular apertures on objects 60 at the scene resulting in projected light patterns 62. The elements of light sources array 110 include the required interface that is needed for its operation such as electrical interface to supply the electrical power, heat dissipation interface for removing the heat which may be generated during its operation.

Due to the irregular angular distribution of the light that is caused by MLA 120, light pattern device 100 generates a pattern of light and shade 62 on the object 60 at the scene. Specifically, MLA 120 angularly redistributes the light intensity of light sources array 110 so the projected light is actually a combination of light and shades. Light sources array 110 may contain, for the sake of simplicity of the interfaces, one or two lines of light sources chip dies. Each element of the MLA 120 projects the light that is emitted from few of the light source dies toward a different direction while projecting on the object 60 at the scene light pattern of regions that are lighted and others that are shaded.

In embodiments, optical element 120 is arranged to produce second illumination pattern 121 (or a resulting illumination image 131 if spatial light modulator 130 is used on top of optical element 120, see below) that comprises separate illumination beams, each having an angular aperture 161 and projected at a specified angle 162 to illuminate only specified regions in the scene or of object 60.

In embodiments, illumination structure 110 comprises an array of light sources, which may be non-coherent, e.g. light emitting diodes (LEDs) such as infrared LEDs. The light sources may be controlled individually and arranged to illuminate a specific region each. The illumination regions may be defined by a specific lens part that projects the light source illumination to a defined spatial region.

In embodiments, device 100 may be used to provide flood illumination with a predefined light distribution 163 that provides relatively bright array of interest according to the application needs. Light distribution 163 may be dynamically controllable in space and time by controlling illumination structure 110, optical element 120 or spatial light modulator 130.

For example, pattern 163 may concentrate 50% of the light flux at an angular aperture of about 20° at the center of the vertical field of view (e.g., about ±10° from the center direction) and the rest 50% may be separated into narrow angle angular beams such as three intensity peeks on either side, at a uniform vertical distribution (FIG. 9).

In embodiments, device 100 further comprises spatial light modulator 130 that is integrally produced upon optical element 120 and arranged to apply a specified spatial pattern to second illumination pattern 121 to yield a resulting illumination image 131 upon illuminated object 60. Spatial light modulator 130 may comprises electric connections of illumination structure 110. Illumination structure 110, optical element 120 and optionally spatial light modulator 130 are packed together in package 150, forming a monolithic device. Spatial light modulator 130 may be part of the LED die top surface that may include the conductor, pads and the wire bonding. Optionally, spatial light modulator 130 may comprise additional elements like additional conducting or pads to provide more details pattern on the scene. In embodiments, spatial light modulator 130 may be integrated into device 100 below optical element 120, such that optical element 120 is on top of device 100, to provide protection of a more delicate or vulnerable spatial light modulator 130.

Figure 10A:
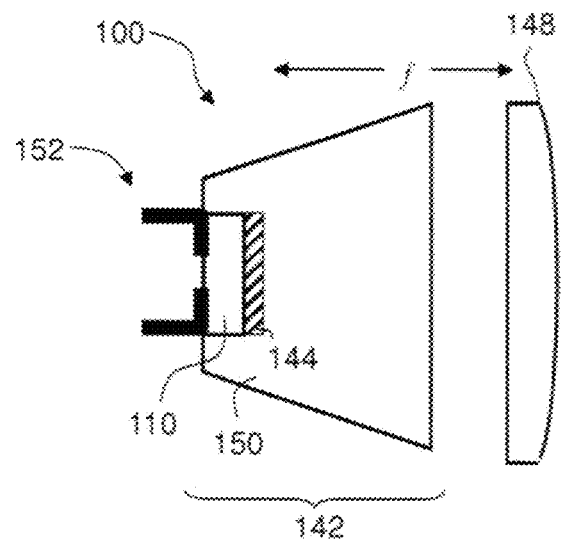
FIGS. 10A-B are schematic illustrations of a light pattern device in embodiment of the invention in which the device comprises a light diffuser.

FIG. 10A is a schematic illustration of device 100 in embodiment of the invention in which device 100 comprises a patterned light emitting surface. In these embodiments, illumination structure 110 (such as a LED or the like, as further detailed hereinabove) has a patterned light emitting surface 144 configured to provide a light beam which is spatially patterned according to light emitting surface 144. Light emitting surface 144 is patterned in the sense that it has a non-uniform transparency to light at a wavelength range provided by illumination structure 110. The non-uniform transparency is optionally and preferably in the form of distinct regions of different transparency. Device 100 optionally and preferably comprises a monolithic package 150 that packs illumination structure 110. Structure 110 can be operated, for example, by applying bias on one or more electrodes 152 attached to structure 110. Optionally, all the electrodes 152 of illumination structure 110 are attached on the back side of illumination structure 110 (opposite to light emitting surface 144), but configurations in which one or more of electrodes 152 are also on surface 144 are also contemplated.

In various exemplary embodiments of the invention device 100 further comprises light redirecting element 148 configured for projecting the pattern light exiting surface 144. Thus, device 100 projects a patterned light beam onto an object in the scene (not shown). Optionally and preferably, surface 144 is at or near (e.g., within tolerance of ±10%) the focal plane of light redirecting element 148.

Figure 10B:
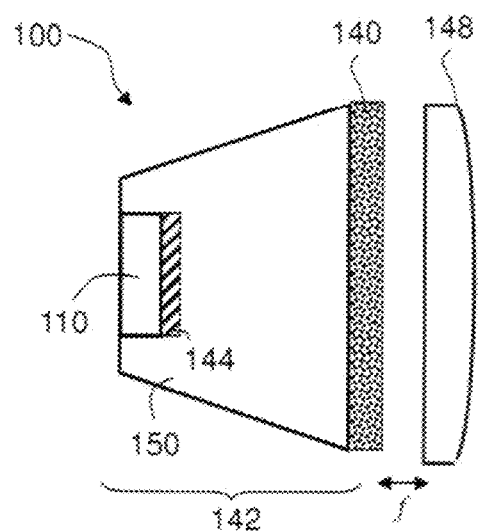

FIG. 10B is a schematic illustration of device 100 in embodiment of the invention in which device 100 comprises a light diffuser 140. In these embodiments, device 100 comprises a monolithic light source element 142 having an illumination structure 110 and a monolithic package 150 that packs structure 110. Structure 110 can optionally, but not necessarily, has a patterned light emitting surface 144 as further detailed hereinabove. Device 100 of the present embodiments also comprises a light diffuser 140 attached to package 150 for diffusing the patterned light beam exiting package 150. Optionally and preferably diffuser 140 is patterned, in the sense that has a non-uniform transparency to light at a wavelength range provided by illumination structure 110.

In various exemplary embodiments of the invention device 100 of FIG. 10B further comprises light redirecting element 148 configured for projecting the diffused light exiting diffuser 140. Thus, device 100 projects a patterned light beam onto an object in the scene (not shown). Optionally and preferably, diffuser 140 is at or near (e.g., within tolerance of ±10%) the focal plane of light redirecting element 148.

In any of the embodiments of the present invention element 148 can be a refractive element or a diffractive element. In embodiments in which a refractive element is employed, element 148 can comprise a microlens, and the redirection of light is generally by the refraction phenomenon described by Snell's law.

In embodiments in element 148 is a diffractive element, element 148 can comprise a grating and the redirection of light is generally by the diffraction phenomenon.

The term "diffracting" as used herein, refers to a change in the propagation direction of a wavefront, in either a transmission mode or a reflection mode. In a transmission mode, "diffracting" refers to change in the propagation direction of a wavefront while passing through the diffractive element; in a reflection mode, "diffracting" refers to change in the propagation direction of a wavefront while reflecting off the diffractive element in an angle different from the basic reflection angle (which is identical to the angle of incidence).

The focal planes at each side of element 148 can be defined as known in the art. For example, when element 148 is a lens, the focal planes can be defined based on the curvature of the lens. When element 148 is a diffractive element, the focal planes can be defined as the planes on which mth diffraction order is converged to a focus, where m is a predetermined integer (e.g., m=1).

Several devices such as device 100 can be arranged together to form a light pattern system 200, as illustrated in FIGS. 11A-D. Such an arrangement can form a light pattern 62 on objects of a scene 60, wherein light pattern 62 is formed of a plurality of individual light patterns 62a, 62b, and 62c, each contributed by a different patterned surface of a different illumination structure. These embodiments are particularly useful when it is not required to vary pattern 60. For example, when pattern 62 is an infrared pattern used by system 10 for example, for identifying one or more field-of-view overlaps among different imaging devices, either for the purpose of stereoscopic three-dimensional reconstruction, or stitching of two or more images.

Figure 11A:
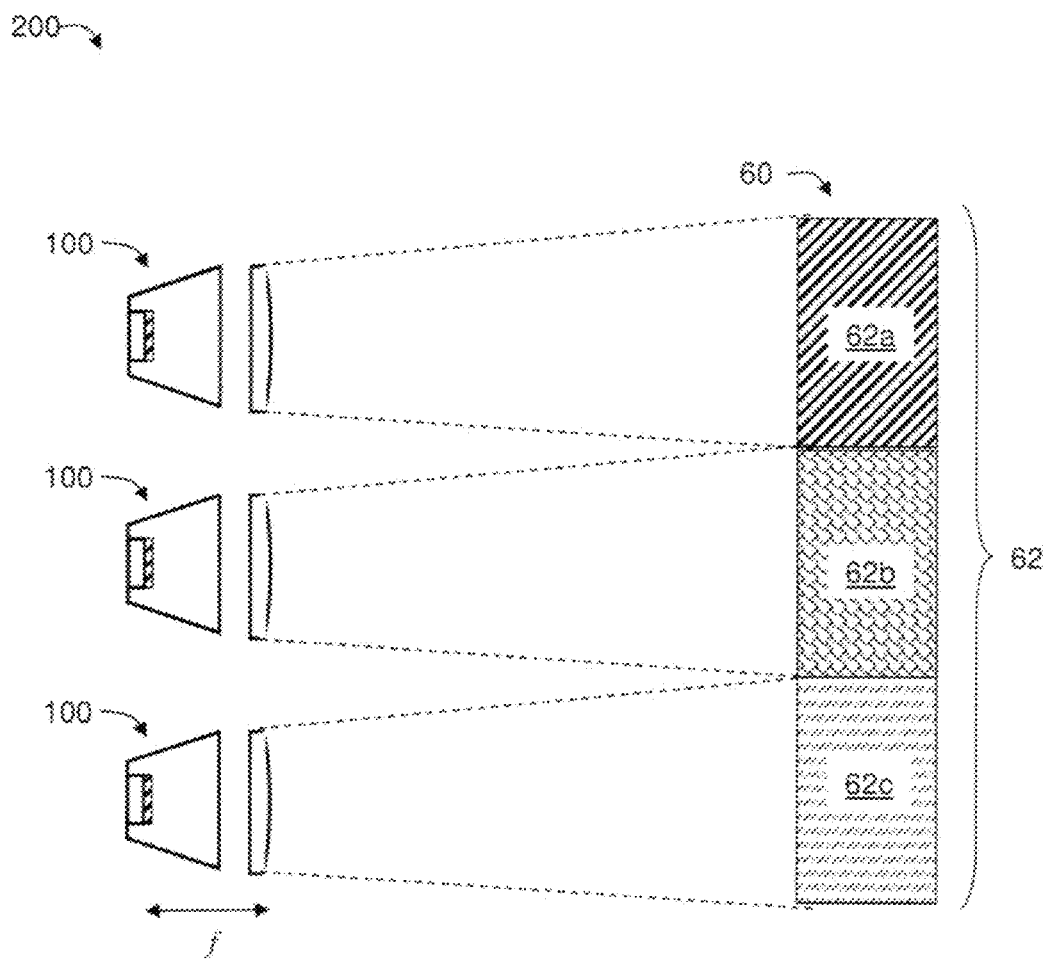
FIGS. 11A-D are schematic illustrations of a light pattern system comprising an arrangement of light pattern devices according to some embodiments of the present invention.
Figure 11B:
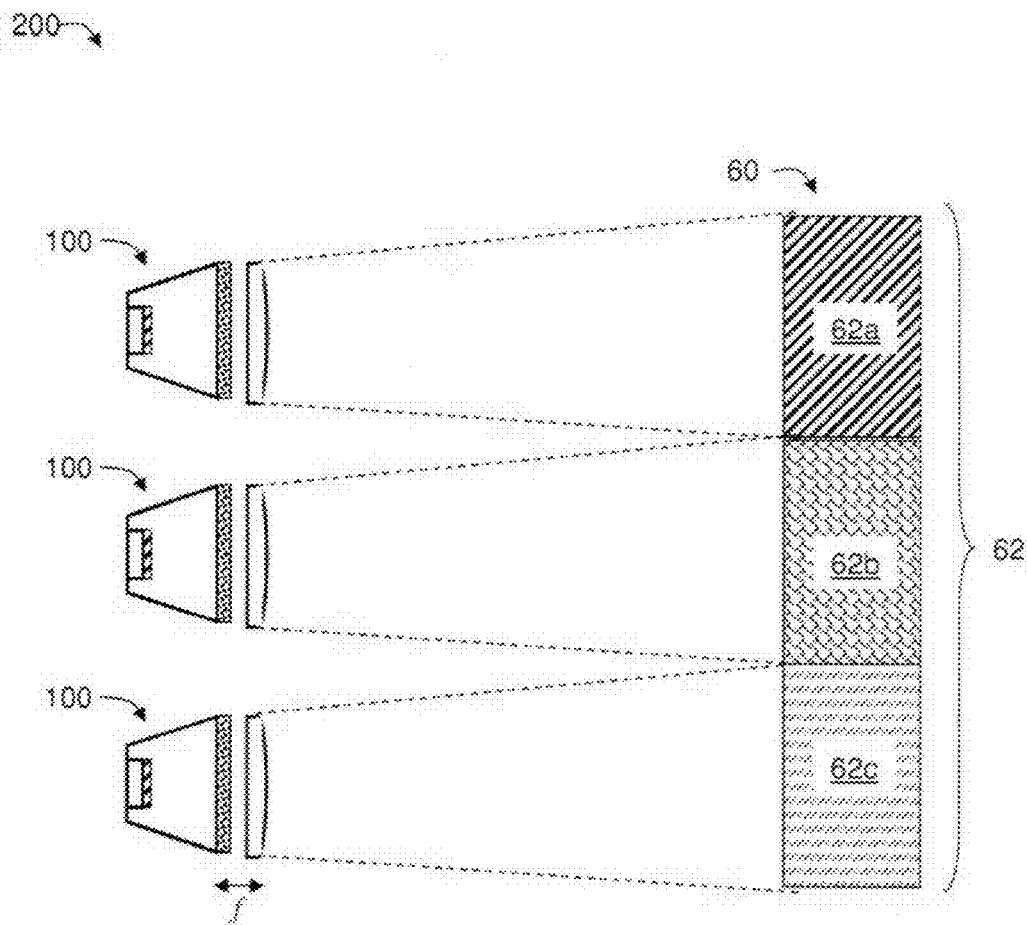

FIG. 11A illustrates an embodiment in which each of at least a few of devices 100 includes a patterned surface, as further detailed hereinabove, and FIG. 11B illustrates an embodiment in which there is each of at least a few of devices 100 includes a separate diffuser (either with or without a patterned light emitting surface within the monolithic package).

Figure 11C:
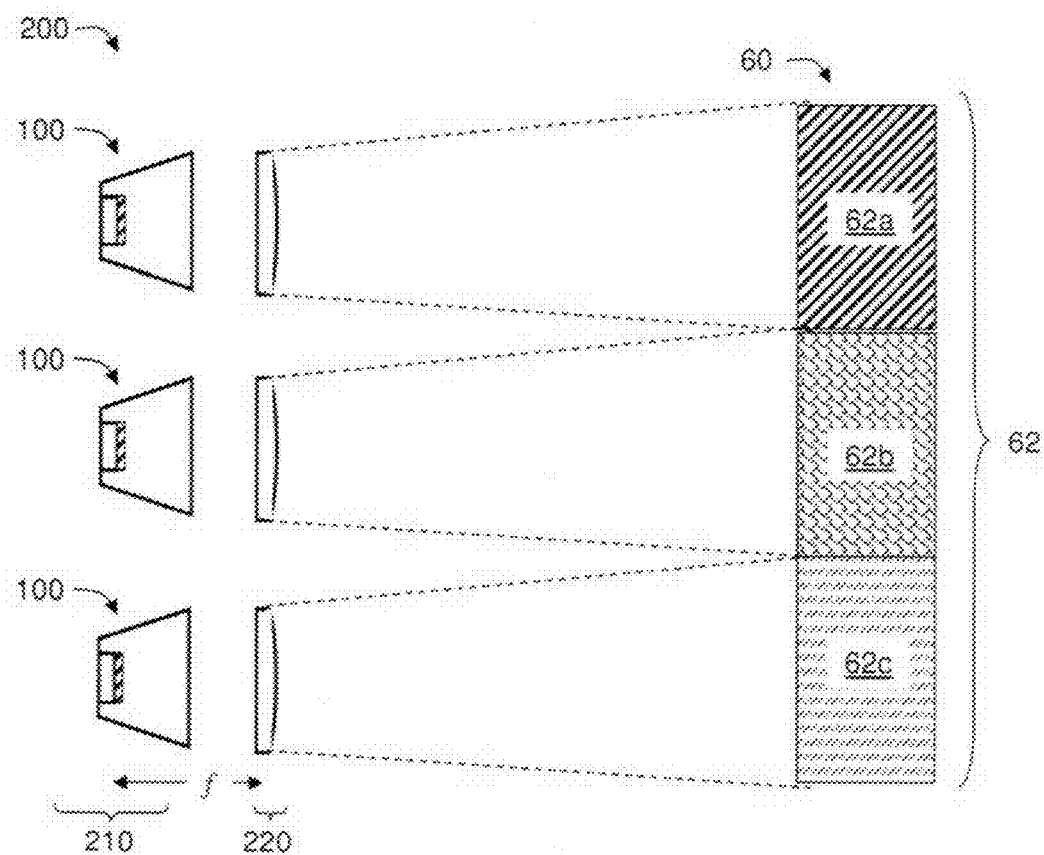

FIG. 11C illustrates an embodiment in which system 200 comprises a first optical layer 210 having an arrangement of monolithic light source elements, wherein each light source element has a patterned light emitting surface, as further detailed hereinabove; and a second optical layer 220 having an arrangement of light redirecting elements and being characterized by a focal plane. The first optical layer 210 is at or near the focal plane of layer 220. The light redirecting elements are constituted to redirect patterned light beams generated by first optical layer 210 to provide patterned illumination, as further detailed hereinabove. Each of the monolithic light source elements of layer 210 can include an illumination structure and optionally a monolithic package, as further detailed hereinabove. Each of the light redirecting elements of layer 220 can be a refractive or diffractive element as further detailed hereinabove.

Figure 11D:
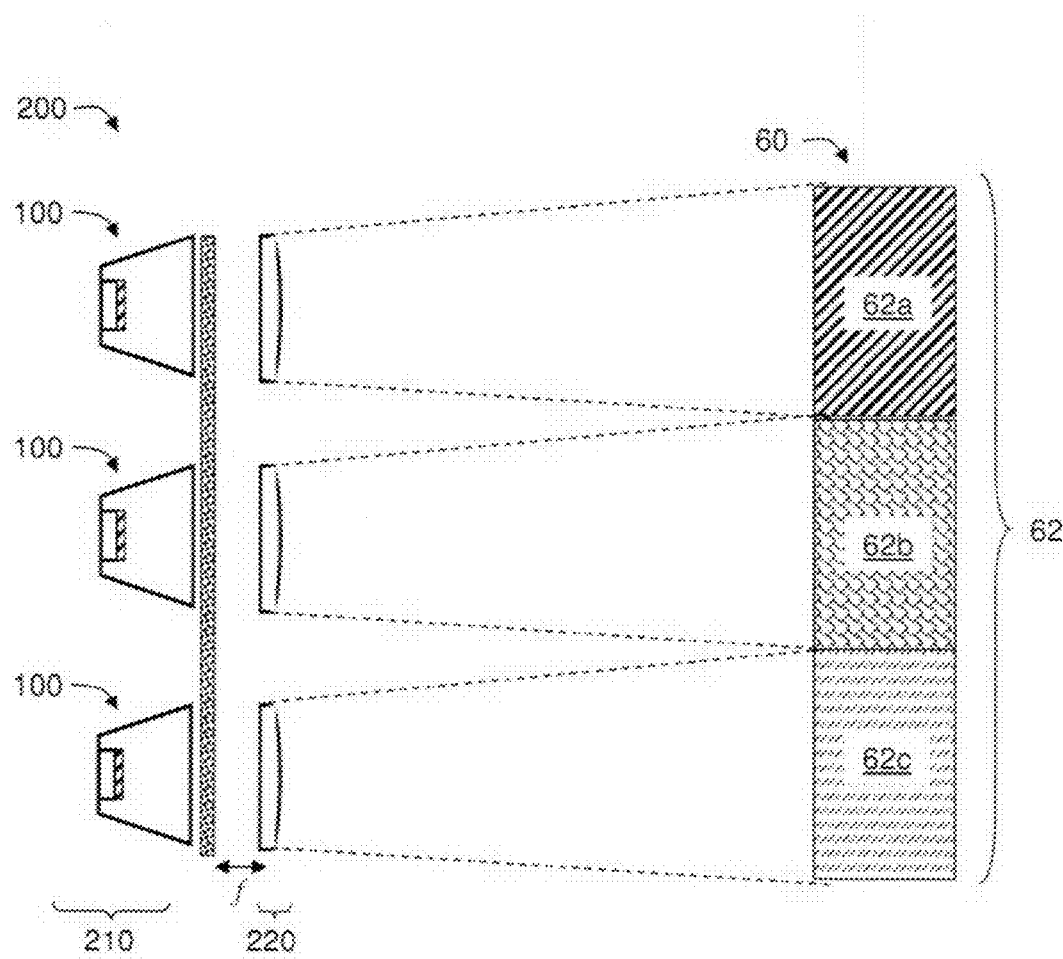

FIG. 11D illustrates an embodiment in which system 200 comprises a first optical layer 210 having an arrangement of monolithic light source elements, a second optical layer 220 having an arrangement of light redirecting elements and being characterized by a focal plane, and a patterned light diffuser positioned between first layer 210 and second layer 220, at or near the focal plane of layer 210. The light redirecting elements redirect light beams generated by first optical layer 210, as further detailed hereinabove. Each of the monolithic light source elements of layer 210 can include an illumination structure (with or without a patterned surface) and optionally a monolithic package, as further detailed hereinabove. Each of the light redirecting elements of layer 220 can be a refractive or diffractive element as further detailed hereinabove.

Figure 12:
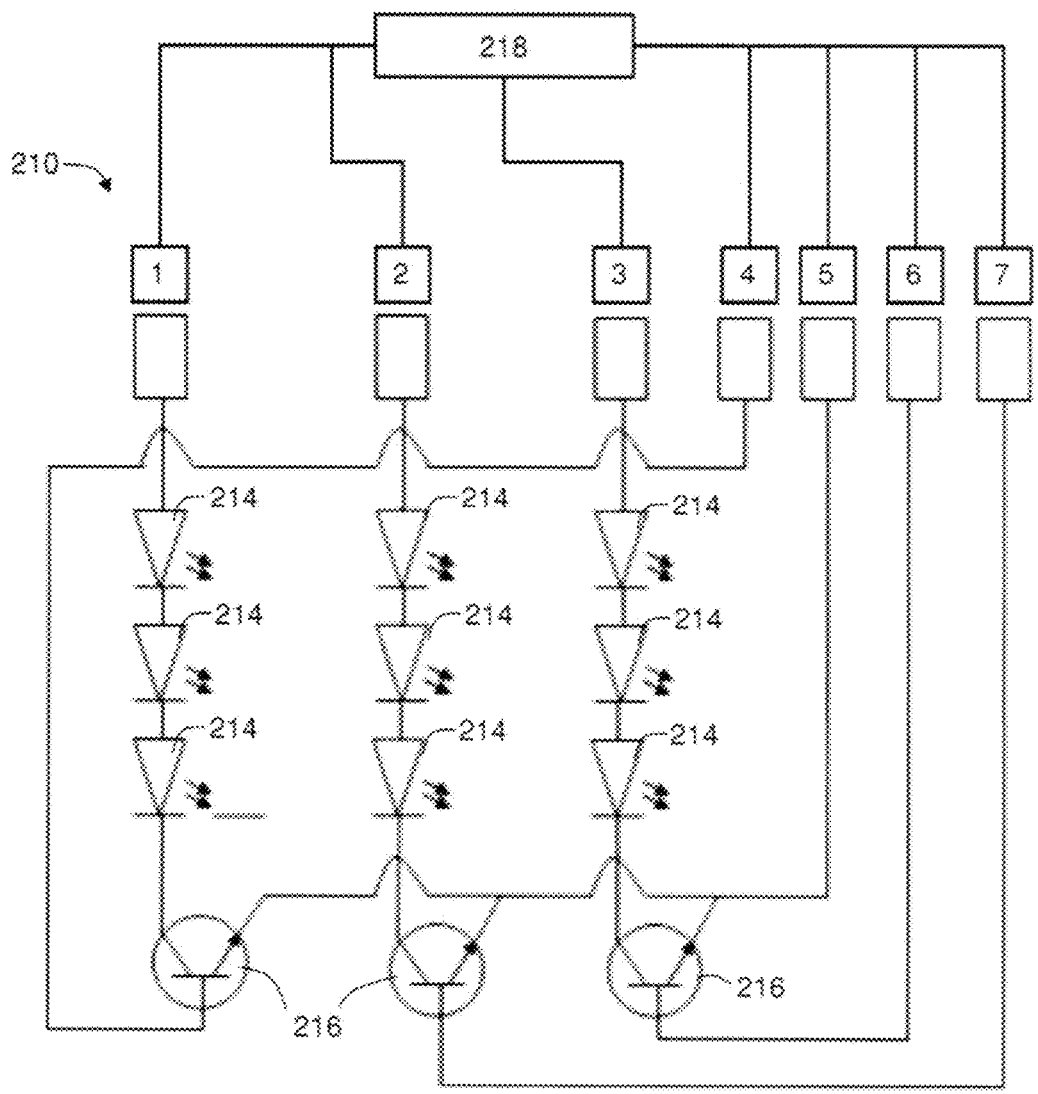
FIG. 12 is a schematic illustration of a top view of an optical layer, according to some embodiments of the present invention.

FIG. 12 is a schematic illustration of a top view of optical layer 210 according to embodiments of the present invention in which the light source elements are arranged in individually addressable lines.

While the embodiments below are described with a particular emphasis to individually addressable lines, it is to be understood that some embodiments contemplate a configuration in which each of the light source elements is addressed individually. One of ordinary skills in the art, provided with the details described herein would know how to adjust the configuration described below for the case in which each of the light source elements is addressed individually.

The light source elements are shown as LEDs 214. Three individually addressable lines are illustrated, but use of any number of lines (preferably more than two lines) is contemplated. Layer 210 comprises an arrangement of electronic switches 216 integrated monolithically on the same optical layer with the light source elements (LEDs 214, in the present example). Electronic switches 216 are shown as transistors, but other circuitry elements are also contemplated. Electronic switches 216 can be controlled by a controller 218 which can be integrated on layer 210 or external to layer 210 as desired.

In the schematic illustration of FIG. 12, which is not to be considered as limiting, each of electronic switches 216 is configured to activate and deactivate at least one of the light source elements. In the illustrated embodiment, each line of the light sources is connected in series between an electrical contact and the collector terminal of one of the transistors 216. The electrical contacts of the individual lines are designated 1, 2 and 3. The emitter terminals of the transistors are jointly connected to an electric contact designated 5.

Each of the gate terminals of the transistors 216 is connected to a separate electrical contact. In FIG. 2, the gate terminal of the transistor of line 1 is connected to electrical contact 4, the gate terminal of the transistor of line 2 is connected to electrical contact 7, and the gate terminal of the transistor of line 3 is connected to electrical contact 6.

In use, bias can be applied between each of contacts 1, 2 and 3 and the joint contact 5, wherein activating and deactivating of each line can be achieved by gating the respective transistor via the respective contact of contacts 4, 6 and 7. For example, when it is desired to activate the leftmost line, controller 218 applies voltage to contact 4 so as to allow current to flow from contact 1 to contact 5. When it is desired to activate only the leftmost line (wherein all other lines are not activated) no voltage is applied to contacts 6 and 7 thereby preventing current from flowing through the other lines.

Some embodiments of the present invention avoids illuminating regions in the scene which are not captured by the camera, in order to optimize the light power distribution at the time and the space domains by synchronizing the illumination with the camera time and with the space capturing process.

In embodiments, the invention comprises a method of producing a light pattern comprising integrating monolithically a light source having a light source surface and a spatial light modulator, further comprises at least one optical element for transmitting the light from the light source to the spatial light modulator. Where the emitted light from the light source surface 115 is emitted according to the spatial structure of the light source surface and is than transmitted through the optical element to pass through the spatial light modulator that spatially modulates light and yield the light pattern.

In embodiments, the monolithic integration further comprises at least one optical element for projecting the light pattern from the spatial light modulator where an image of the light pattern of the light surface 115 is projected on the object at the scene to provide the light pattern.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find support in the following examples.

EXAMPLES

Reference is now made to the following examples, which together with the above descriptions illustrate some embodiments of the invention in a non limiting fashion.

In some embodiments of the present invention system 10, for example, the computer system thereof, performs a demosaic process in which for each pixel in the imager, an appropriate color value is calculated, based on the arrangement of the individual filters in the color filter array. The color value can be in optional color basis, including, without limitation, RGB, YUV and the like. The demosaic procedure depends on the ratio between the intensity value of each colored pixel to provide white color. These ratio parameters are referred to as white balance parameters and are typically calculated automatically by an electronic calculation functionality embedded in the imager. Commercially available imagers, however, include an overall infrared CUT filter to ensure that the color separation by the color filter array is not contaminated by infrared light.

In the present embodiments, the imager is devoid of infrared filter and system 10 corrects the white balance parameters as calculated by the imager so as to take into account signals generated by pixels in response to interaction with infrared light.

White balance parameters received by computer system from the imager are denoted Wr, Wb, Wgr, Wgb, Cr, Cb, Cgr, Cgb, where Wr, Wb, Wgr, Wgb are weight parameters, Cr, Cb, Cgr, Cgb are offset grey level values, r denotes a red pixel, b denotes a blue pixel, gr denotes a green pixel that is part of a row or column that contain red pixels, and gb denotes a green pixel that is part of a row or column that contain blue pixels. Herein, Wr, Wb, Wgr, Wgb are collectively denoted $W_x$, and Cr, Cb, Cgr, Cgb are collectively denoted $C_x$, where the subscript x can be r, b, gr or gb.

For each pixel, the intensity value I, typically measured in grey level values, can be transformed using the respective weight and offset parameters, according to the equation:

$$P_x = W_x * I + C_x.$$

When the imaging device has an electronic-calculation functionality configured for AWB, the parameters $W_x$ and $C_x$ can be received from the imaging device.

Following is a procedure suitable for calibrating the system.

The system is activated to capture a burst of several frames (e.g., 4-5 frames) at which the imager is operated at its automatic mode, without infrared illumination. An indication that an exposure time has been set by the imager (for example, following an automatic process performed by the imager. The imager is then operated at manual mode, and various parameters are read from the imager. Representative examples of parameters that can be read from the imager include, without limitation, the white balance parameters, the exposure time of rolling shutter, the analog gain, the black level and the brightness.

The parameters received from the imager are then corrected, separately for each operation mode. For example, $C_x$ can be reduced by about 8-12% (e.g., 10%), Wr can be reduced by about 15-25% (e.g., 20%), and Wgr, Wgb and Wb can be increased by about 3-7% (e.g., 5%). The corrected parameters are then stored in a memory medium associated with the computer system for use by controller 22 to control the imager in the respective operation mode, and further for use by computer system 20 in the demosaic process.

Once system 10 is calibrated, the subsequent operation is optionally and preferably performed using the stored corrected parameters. Thus, controller 22 writes into the imager at least some of the corrected parameters, particularly the exposure time of rolling shutter, the analog gain, and the black level. Controller 22 activates the imager according to the selected operation mode. Image data from the imager are then received by computer system 20 which performs the demosaic procedure using the corrected white balance parameters.

In some embodiments of the present invention brightness values are read from the imager and the aforementioned parameters (exposure time, white balance, analog gain, black level) are updated in an iterative manner. When a significant change in the brightness values is detected, a recovery procedure can be employed, by performing GSV activity.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. An imaging system, comprising:
   an imaging device having a plurality of sensor pixels and a rolling shutter, and being configured for generating line valid signal (LV) pulses for controlling exposure times of said sensor pixels to acquire an image of a scene over a spectral range from infrared to visible light, according to a sensing sequence of said rolling shutter;
   an infrared light source configured for generating an infrared pulse sequence illuminating at least part of said scene; and
   a controller for synchronizing said infrared pulse sequence with said LV pulses, in a manner that for each infrared pulse of said sequence and each LV pulse that controls a sensor pixel exposed to said infrared pulse, an onset of said infrared pulse precedes an onset of said LV pulse by a predetermined time offset.

2. The system according to claim 1, comprising a plurality of infrared light sources, each constituted to illuminate a predetermined part of said scene, wherein said controller is configured for activating and deactivating said light sources synchronously with a temporal field-of-view provided by said rolling shutter.

3. The system according to claim 1, comprising a plurality of infrared light sources, each constituted to illuminate a predetermined part of said scene, wherein said controller is configured for activating and deactivating said light sources synchronously with a temporal field-of-view provided by said rolling shutter.

4. The system according to claim 2, wherein at least one of said plurality of infrared light sources is configured for generating flood infrared illumination.

5. The system according to claim 3, wherein at least one of said plurality of infrared light sources is configured for generating flood infrared illumination.

6. The system according to claim 2, wherein at least one of said plurality of infrared light sources is configured for generating an infrared pattern.

7. The system according to claim 2, wherein at least one of said plurality of infrared light sources is configured for generating an infrared pattern.

8. The system according to claim 6, wherein said at least one of said plurality of infrared light sources is a light pattern device, which comprises:
   a first optical layer having an arrangement of monolithic light source elements, each light source element having a patterned light emitting surface configured to provide a light beam which is spatially patterned according to said light emitting surface; and
   a second optical layer having an arrangement of light redirecting elements and being characterized by a focal plane, said light redirecting elements being constituted to redirect patterned light beams generated by said first optical layer to provide patterned illumination.

9. The system according to claim 8, wherein said first optical layer is at or near said focal plane.

10. The system according to claim 8, further comprising a light diffuser positioned between said first and said second optical layers at or near said focal plane.

11. The system according to claim 8, wherein said light source elements are arranged in individually addressable lines.

12. The system according to claim 9, wherein said light source elements are arranged in individually addressable lines.

13. The system according to claim 8, wherein each of said light source elements is addressable individually.

14. The system according to claim 9, wherein each of said light source elements is addressable individually.

* * * * *